(12) United States Patent
Fukuda et al.

(10) Patent No.: US 8,998,429 B2
(45) Date of Patent: Apr. 7, 2015

(54) PRINTED MATERIAL AND PHOTOGRAPHIC MATERIAL

(75) Inventors: Tomoo Fukuda, Tochigi (JP); Mitsuo Arima, Miyagi (JP); Sung-kil Lee, Tochigi (JP); Yu Nomura, Miyagi (JP); Hiroyuki Kiso, Miyagi (JP); Fumihiko Iida, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/006,802

(22) PCT Filed: Mar. 30, 2012

(86) PCT No.: PCT/JP2012/059424
§ 371 (c)(1),
(2), (4) Date: Nov. 20, 2013

(87) PCT Pub. No.: WO2012/133943
PCT Pub. Date: Oct. 4, 2012

(65) Prior Publication Data
US 2014/0063607 A1  Mar. 6, 2014

(30) Foreign Application Priority Data

Mar. 31, 2011  (JP) .................................. 2011-081165

(51) Int. Cl.
G02B 27/42 (2006.01)
(52) U.S. Cl.
CPC .............. G02B 1/118 (2013.01); G02B 27/42 (2013.01)
(58) Field of Classification Search
CPC .......... B29D 11/00; B29C 33/42; B32B 3/30; B32B 15/00; G02B 5/00; G02B 5/18; G02B 5/0278; G02B 5/128; G02B 27/00; G02B 27/42; G02B 1/11; G02B 1/118; G03F 7/20
USPC ................... 359/566, 577; 264/1.1, 1.24, 1.6; 428/156, 172, 141; 249/187.1; 430/321; 427/162, 163.1, 163.2, 163.3, 427/163.4

See application file for complete search history.

(56) References Cited

U.S. PATENT DOCUMENTS

| 8,034,434 | B2* | 10/2011 | Sakuma et al. | 428/172 |
| 2002/0160166 | A1* | 10/2002 | Hattori | 428/212 |
| 2005/0094277 | A1* | 5/2005 | Khusnatdinov et al. | 359/601 |
| 2008/0088931 | A1* | 4/2008 | Hoffman | 359/580 |
| 2008/0304155 | A1* | 12/2008 | Endoh et al. | 359/558 |
| 2009/0135491 | A1* | 5/2009 | Endoh et al. | 359/601 |
| 2010/0134892 | A1* | 6/2010 | Endoh et al. | 359/601 |
| 2010/0247756 | A1* | 9/2010 | Inoue et al. | 427/162 |
| 2010/0247757 | A1* | 9/2010 | Inoue | 427/162 |
| 2010/0328776 | A1* | 12/2010 | Sanari et al. | 359/601 |

FOREIGN PATENT DOCUMENTS

| JP | 2004-284178 | 10/2004 |
| JP | 2006-182012 | 7/2006 |
| WO | WO 2010/143503 A1 | 12/2010 |
| WO | WO 2011/033818 A1 | 3/2011 |

* cited by examiner

*Primary Examiner* — Suchin Parihar
*Assistant Examiner* — William R Alexander
(74) *Attorney, Agent, or Firm* — Sony Corporation

(57) ABSTRACT

A printed material includes a printed material body with a surface, and an optical element disposed on the surface of the printed material body. The optical element includes multiple structures formed at a pitch not longer than the wavelength of visible light. The structures have an aspect ratio of 0.6 or more and 5.0 or less.

19 Claims, 18 Drawing Sheets

FIG. 2
A 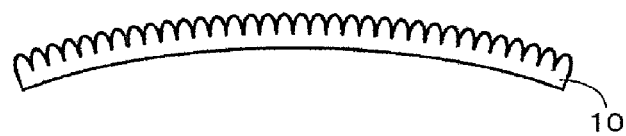
B 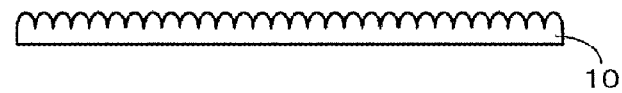
C 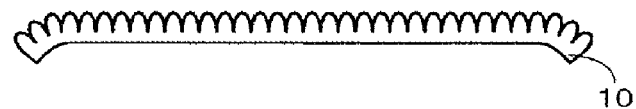

FIG. 7
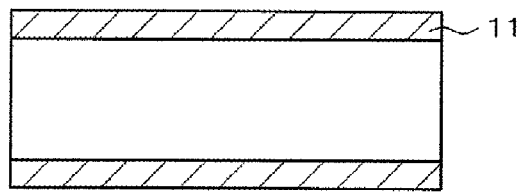
A
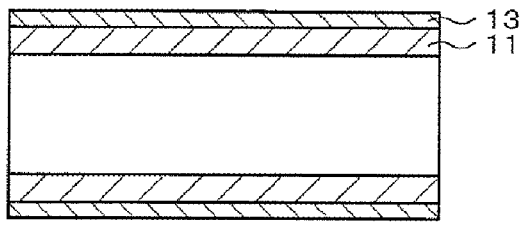
B
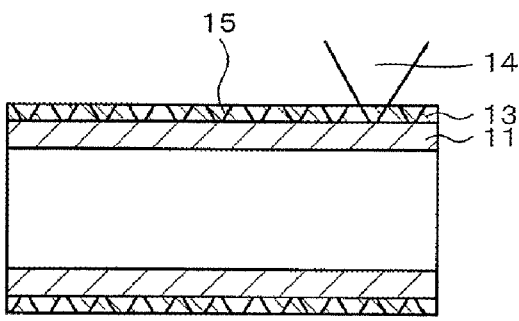
C
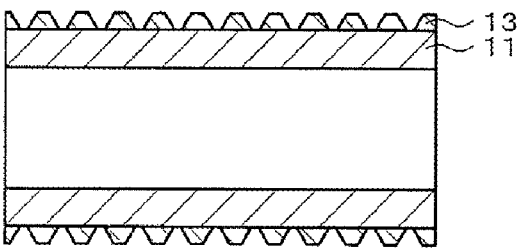
D

FIG. 8
A
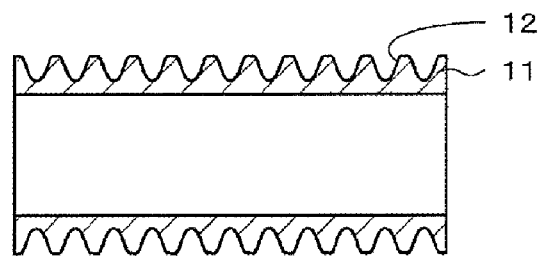
B
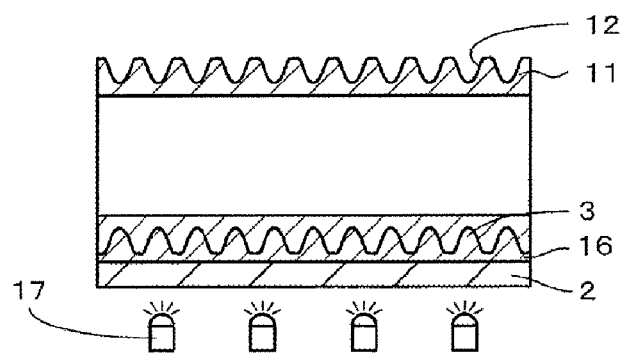
C
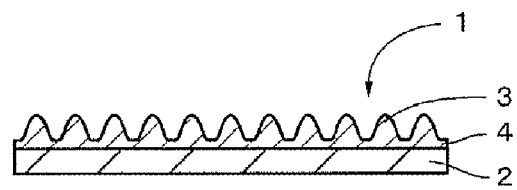
D
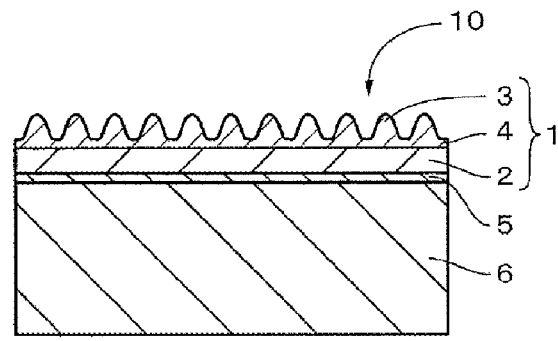

FIG. 10
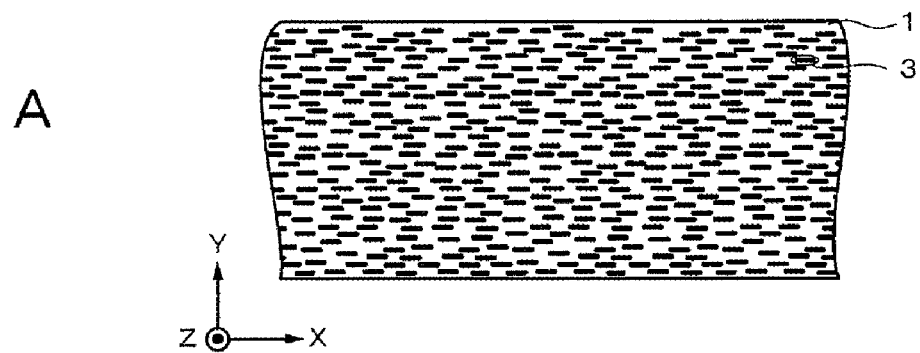
A
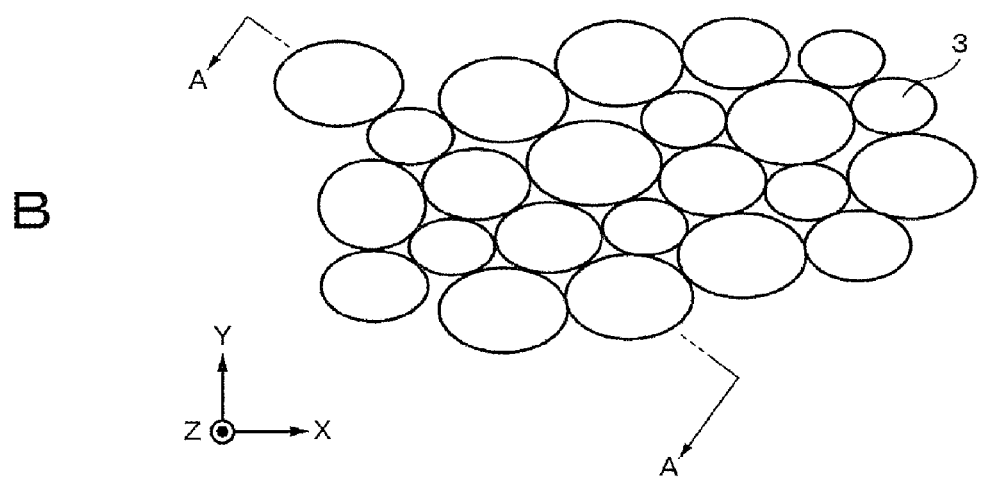
B
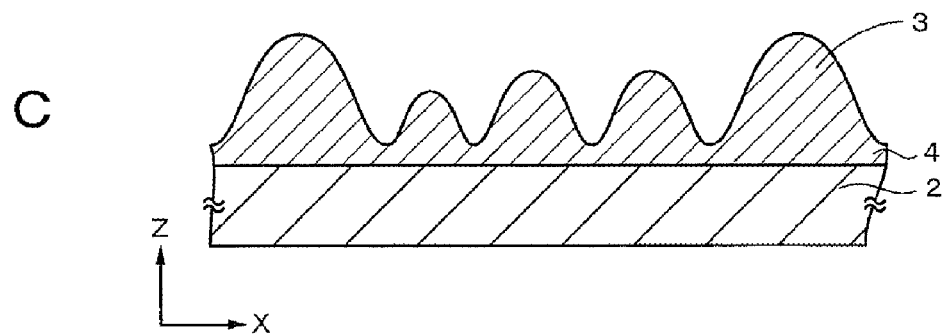
C

FIG. 12
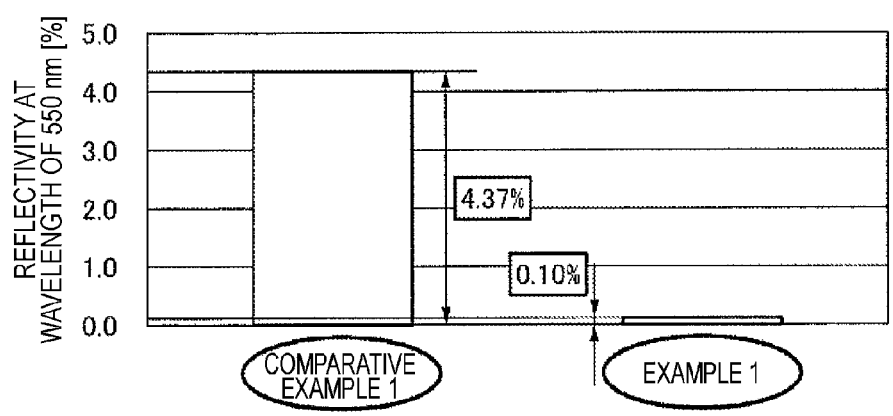
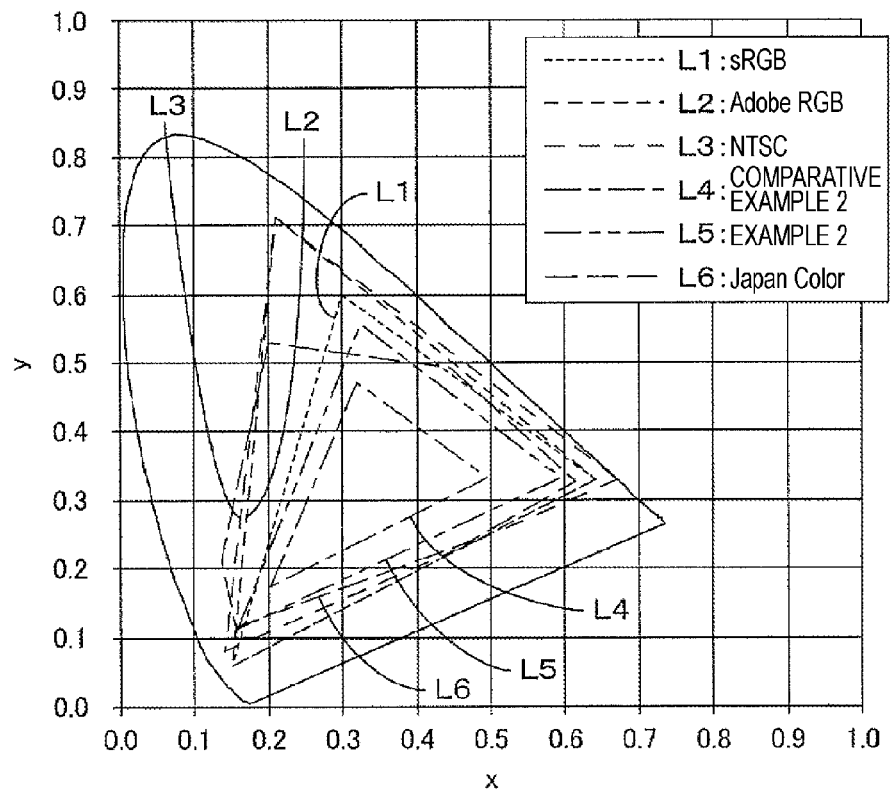

FIG. 14
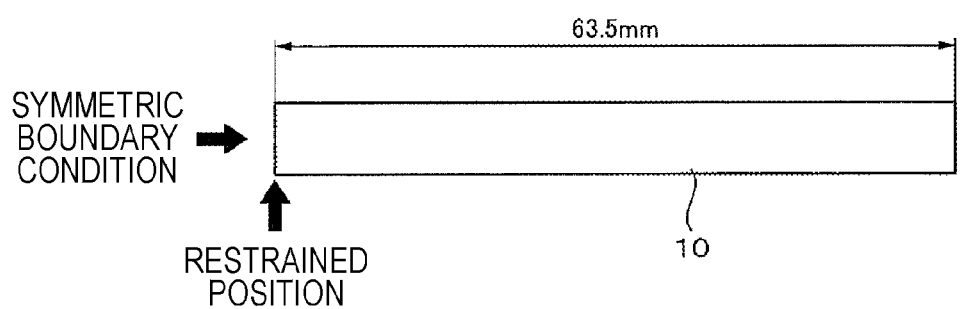
A
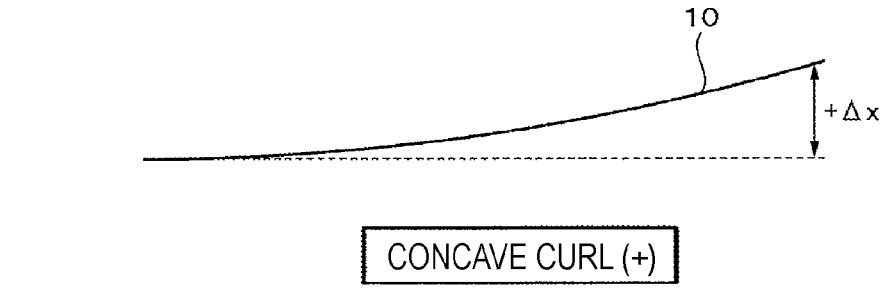
B
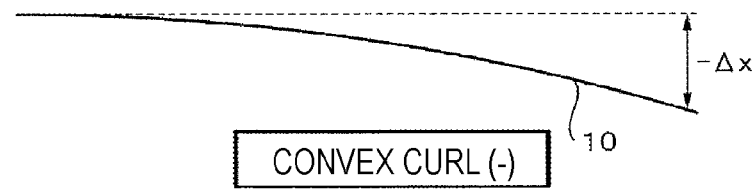
C

FIG. 15
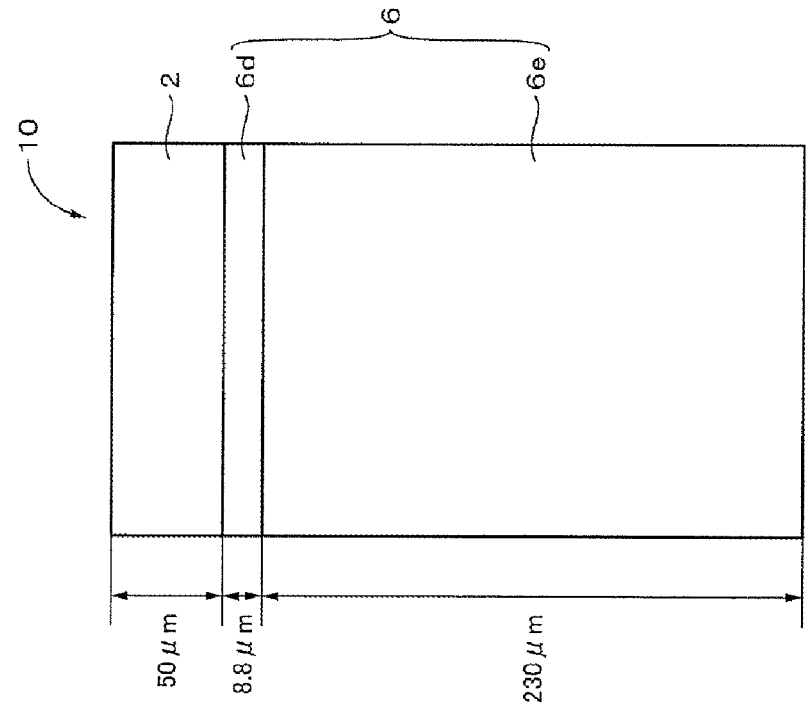
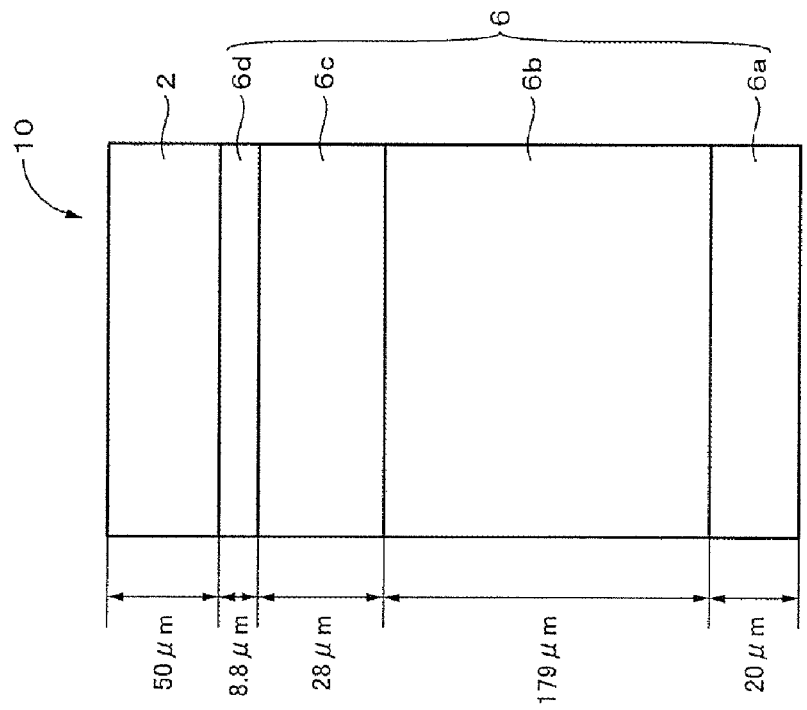

FIG. 16
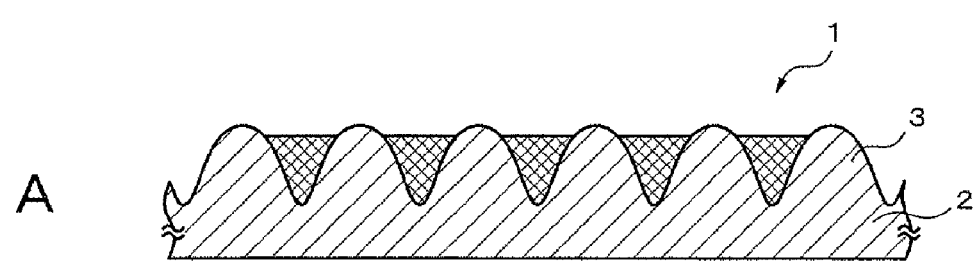
A
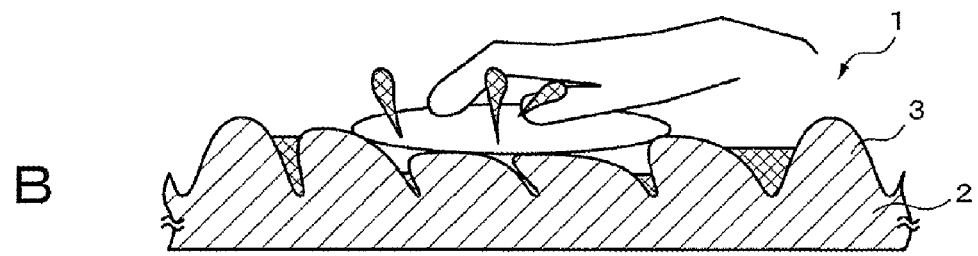
B
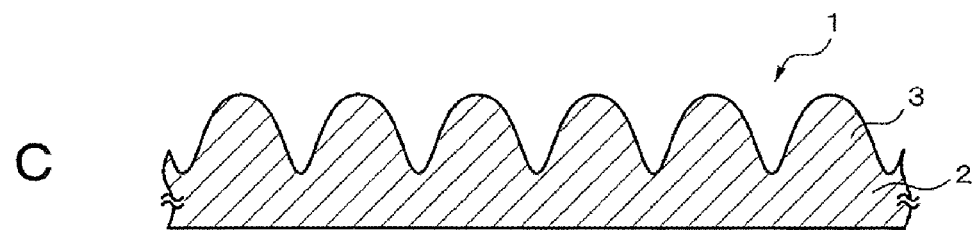
C

PRINTED MATERIAL AND PHOTOGRAPHIC MATERIAL

TECHNICAL FIELD

This technique relates to a printed material and photographic material. More specifically, the technique relates to a printed material and a photographic material which can improve visibility.

BACKGROUND ART

For example, in the case of photographic paper, in order to make the black more black, the surface of the photographic paper is made to be a glossy surface as much as possible, so as not to diffuse the reflection of outside light to stand out blackly. However, when the diffuse reflection is reduced, the regular reflection is increased, and when the light source such as a fluorescent light is consequently recognized visually at an angle of reflection in the printed material, the light source is directly recognized visually, thereby making it almost impossible to recognize the printed image.

When there is concern about the light source image or the like formed by the regular reflection, the surface of the photographic paper is conversely processed for a mat or the like to diffuse the component of outside light and reduce the regular reflection component (for example, see Patent Document 1). However, when the diffusion component is increased, the diffuse reflection component of outside light is added to the black part, thus standing out blackly as a result. As described above, it is difficult to achieve a reduction balance between the regular reflection component and diffuse component of a light source. For this reason, it has been desirable to improve the visibility of photographic paper.

CITATION LIST

Patent Document

Patent Document 1: Japanese Patent Application Laid-Open No. 2006-182012

SUMMARY OF THE INVENTION

Problems to be Solved by the Invention

Therefore, an object of this technique is to provide a printed material and a photographic material which can improve visibility.

Solutions to Problems

In order to solve the problem described above, a first aspect of the technique is a printed material including:

a printed material body having a surface; and an optical layer provided on the surface of the printed material body, where the optical layer includes multiple structures formed at a pitch of not longer than the wavelength of the visible light, and the structures have an aspect ratio of 0.6 or more and 5.0 or less.

A second aspect of the technique is a photographic material including:

a photographic material body having a surface; and an optical element provided on the surface of the photographic material body, where the optical element includes multiple structures formed at a pitch of not longer than the wavelength of visible light, and the structures have an aspect ratio of 0.6 or more and 5.0 or less.

In this technique, shapes such as an ellipse, a circle (perfect circle), a sphere, and an ellipsoid encompass not only mathematically defined perfect ellipses, circles, spheres, and ellipsoids, but also shapes such as somewhat strained ellipses, circles, spheres, and ellipsoids.

In this technique, the structures which have a convex shape or a concave shape are preferably arranged in a predetermined grid form. As the grid form, it is preferable to use a square grind form or a quasi-square grind form, or a hexagonal grid form or a quasi-hexagonal grid form.

In this technique, the arrangement pitch P1 of the structures in the same track is preferably longer than the arrangement pitch P2 of the structures between two adjacent tracks. This arrangement can improve the packing ratio of the structures which have the shape of an elliptic cone or an elliptic conical trapezoid, and thus improve the antireflection characteristics.

In this technique, when each structure forms a hexagonal grid pattern or a quasi-hexagonal grid pattern at the substrate surface, the ratio P1/P2 preferably satisfies the relationship of $1.00 \leq P1/P2 \leq 1.1$ or $1.00 < P1/P2 \leq 1.1$ where the arrangement pitch of the structures in the same track and the arrangement pitch of the structures between two adjacent tracks are respectively denoted by P1 and P2. This numerical range can improve the packing ratio of the structures which have the shape of an elliptic cone or an elliptic conical trapezoid, and thus improve the antireflection characteristics.

In this technique, when the respective structures form a hexagonal grid pattern or a quasi-hexagonal grid pattern on the substrate surface, each structure preferably has the shape of an elliptic cone or an elliptic conical trapezoid that has a long-axis direction in the extending direction of the track and has a central slope formed to be steeper than the slopes of the apical end and bottom. This shape can improve the antireflection characteristics and transmission characteristics.

In this technique, when each structure forms a hexagonal grid pattern or a quasi-hexagonal grid pattern at the substrate surface, the height or depth of the structure in the extending direction of the track is preferably smaller than the height or depth of the structure of in the row of the track. If this relationship is not satisfied, the packing ratio of the structures will be decreased in the extending direction of the track, because of the need to lengthen the arrangement pitch in the extending direction of the track. This decrease in packing ratio will lead to decreased reflection characteristics.

In this technique, when the structure forms a square grid pattern or a quasi-square grid pattern at the substrate surface, the arrangement pitch P1 of the structures in the same track is preferably longer than the arrangement pitch P2 of the structures between two adjacent tracks. This arrangement can improve the packing ratio of the structures which have the shape of an elliptic cone or an elliptic conical trapezoid, and thus improve the antireflection characteristics.

When the structure forms a square grid pattern or a square grid pattern at the substrate surface, the ratio P1/P2 preferably satisfies the relationship of $1.4 < P1/P2 \leq 1.5$ where the arrangement pitch of the structures in the same track and the arrangement pitch of the structures between two adjacent tracks are respectively denoted by P1 and P2. This numerical range can improve the packing ratio of the structures which have the shape of an elliptic cone or an elliptic conical trapezoid, and thus improve the antireflection characteristics.

When the structures form a square grid pattern or a quasi-square grid pattern on the substrate surface, each structure preferably has the shape of an elliptic cone or an elliptic conical trapezoid that has a long-axis direction in the extending direction of the track and has a central slope formed to be steeper than the slopes of the apical end and bottom. This shape can improve the antireflection characteristics and transmission characteristics.

When the structures form a square grid pattern or a quasi-square grid pattern on the substrate surface, the height or depth in a direction at 45 degrees or in a direction at approximately 45 degrees with respect to the track is preferably smaller than height or depth of the structure in the row direction of the track. When this relationship is not satisfied, there is a need to lengthen the arrangement pitch in the direction at 45 degrees or in the direction at approximately 45 degrees with respect to the track, and the packing ratio of the structure is decreased in the direction at 45 degrees or in the direction at approximately 45 degrees with respect to the track. This decrease in packing ratio will lead to decreased reflection characteristics.

In this technique, the large number of structures provided on the substrate surface at a fine pitch preferably makes multiple rows of tracks, and also makes a hexagonal grid pattern, a quasi-hexagonal grid pattern, a square grid pattern, or a quasi-square grid pattern among adjacent three rows of tracks. Thus, the packing density of structures at the surface can be increased, thus increasing the efficiency of preventing the visible light reflection, and achieving an optical element that is excellent in antireflection characteristics and high in transmission.

In this technique, it is preferable to prepare the optical element with the use of the fusion of a process for preparing an optical disc master and an etching process. The method can efficiently produce the master for the preparation of the optical element for a short period of time, and also deal with the increase in substrate size, thus making an improvement in the productivity of the optical element. In addition, when the fine arrangement of the structures is provided at not only the light incidence plane but also the light outgoing plane, the transmission characteristics can be further improved.

This technique can suppress the reflection of visible light because the multiple structures are arranged at a fine pitch not longer than the wavelength of visible light. Therefore, the contrast can be improved in a printed image of the printed material or a photographic image of the photographic material. In addition, the decreases in reflection characteristics and transmission characteristics can be suppressed because the structures have an aspect ratio adjusted to 0.6 or more, whereas the decrease in transferability of the structures can be suppressed because the structures have an aspect ratio adjusted to 5 or less.

Effects of the Invention

As described above, the visibility of the printed material and photographic material can be improved.

BRIEF DESCRIPTION OF DRAWINGS

FIGS. 2A to 2C are pattern diagrams illustrating shape examples of an optical element.

in FIG. 3B. in FIG. 3B.

in FIG. 5B. in FIG. 5B.

FIG. 7A is a step diagram for explaining an example of a method for producing an optical element according to the first embodiment of this technique. FIG. 7B is a step diagram for explaining an example of the method for producing an optical element according to the first embodiment of this technique. FIG. 7C is a step diagram for explaining an example of the method for producing an optical element according to the first embodiment of this technique. FIG. 7D is a step diagram for explaining an example of the method for producing an optical element according to the first embodiment of this technique.

FIG. 8A is a step diagram for explaining an example of a method for producing an optical element according to the first embodiment of this technique. FIG. 8B is a step diagram for explaining an example of the method for producing an optical element according to the first embodiment of this technique. FIG. 8C is a step diagram for explaining an example of the method for producing an optical element according to the first embodiment of this technique. FIG. 8D is a step diagram for explaining an example of the method for producing an optical element according to the first embodiment of this technique.

in FIG. 9B. in FIG. 9B.

FIG. 10A is a plan view illustrating an example of the structure of an optical element according to a third embodiment of this technique. FIG. 10B is a plan view illustrating an enlarged part of the optical element shown in FIG. 10A. FIG. 10C is a cross-sectional view along the line A-A shown in FIG. 10A.

in FIG. 11B. in FIG. 11B.

FIG. 12A is a graph showing the reflectivity of printed paper according to Example 1 and Comparative Example 1. FIG. 12B is a diagram showing the L*a*b* color space of photographic paper according to Example 2 and Comparative Example 2.

FIG. 14A is a schematic diagram of an analysis model according to test example 21. FIG. 14B is a pattern diagram for explaining the curl amount of concave curl. FIG. 14C is a pattern diagram for explaining the curl amount of convex curl.

FIG. 15A is a pattern diagram illustrating the layer structure of printed paper as an analysis model according to test example 21. FIG. 15B is a pattern diagram illustrating the layer structure of printed paper as an analysis model according to test example 23.

FIG. 16A is a schematic diagrammatic view for explaining the removal of contamination in the case of adhering to the surface of an optical element. FIG. 16B is a schematic diagrammatic view for explaining the removal of contamination in the case of adhering to the surface of the optical element. FIG. 16C is a schematic diagrammatic view for explaining the removal of contamination in the case of adhering to the surface of the optical element.

MODES FOR CARRYING OUT THE INVENTION

Embodiments of this technique will be described in the following order with reference to the drawings.
1. First Embodiment (an example of a printed material including an optical element that has convex structures arranged in a (quasi-)hexagonal grid form)
2. Second Embodiment (an example of a printed material including an optical element that has convex structures arranged in a (quasi-)quarter grid form)
3. Third Embodiment (an example of a printed material including an optical element that has convex structures arranged in a random manner)
4. Fourth Embodiment (an example of a printed material including an optical element that has concave structures arranged in a (quasi-)hexagonal grid form)
5. Fifth Embodiment (an example with a specific crosslink density)

<1. First Embodiment>
[Structure of Printed Material]

Figure 1:
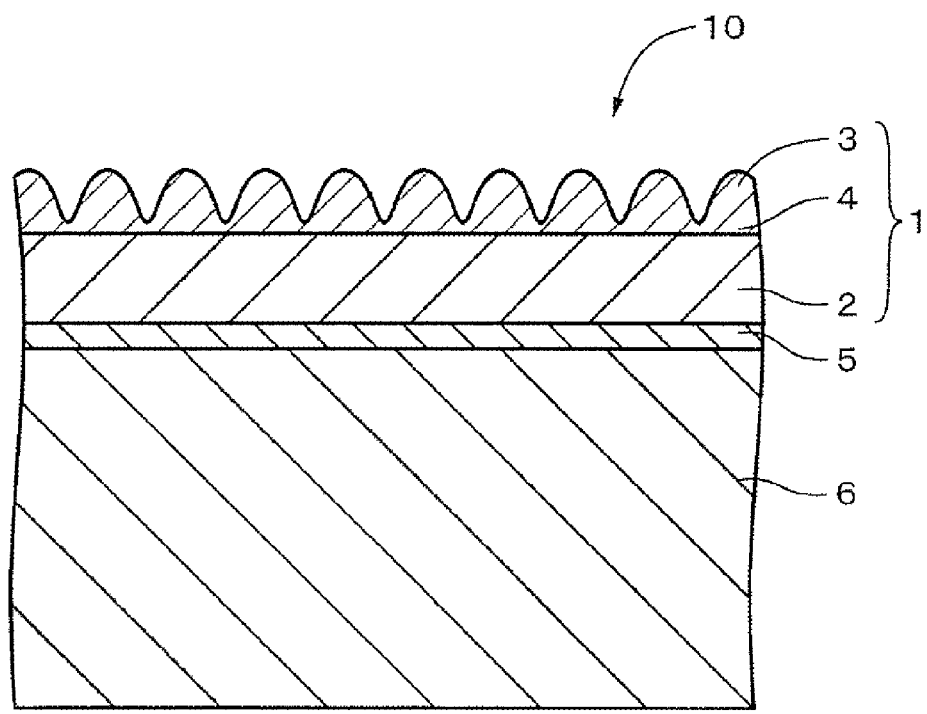
FIG. 1 is a cross-sectional view illustrating an example of the structure of a printed material according to a first embodiment of this technique.

FIG. 1 is a cross-sectional view illustrating an example of the structure of a printed material according to a first embodiment of this technique. As shown in FIG. 1, a printed material 10 includes: a printed material body 6 with a surface; and an optical element 1 provided on the surface of the printed material body 6. The printed material 10 may further include an attachment layer 5 so that the printed material body 6 and the optical element 1 are attached to each other with the attachment layer 5 interposed therebetween. For example, adhesives such as acrylic, rubber, and silicon pressure sensitive adhesives can be used for the material for the attachment layer 5, and acrylic pressure sensitive adhesives are preferred in terms of transparency. The surface of the printed material body 6 is, for example, a printed image surface with an image printed. Hereinafter, as for both principal surfaces of the printed material 10, the principal surface with the optical element 1 provided is referred to as a "surface", whereas the principal surface opposite thereto is referred to as a "back surface".

FIGS. 2A to 2C are pattern diagrams illustrating shape examples of a printed material according to the first embodiment of this technique. As shown in FIG. 2A, the printed material 10 is preferably curved so as to project the surface, and the curve is particularly preferred with a central portion of the surface as the top of the curve. This is because the curve can provide a beautiful appearance.

The printed material 10 preferably has a planar peripheral edge (FIG. 2B) or a curved peripheral edge (FIG. 2C). The curved surface herein has a peripheral edge curved in a direction opposite to the optical element 1, as shown in FIG. 2C. Thus, such a curvature that projects the back surface can be suppressed to maintain the beautiful appearance.

The linear expansion coefficient of the optical element 1 is preferably higher than the linear expansion coefficient of the printed material body 6. This is because such a curvature that projects the back surface can be suppressed to maintain the beautiful appearance under high-temperature and/or high-humidity environments. In this case, when the printed material body 6 has a stacked structure composed of multiple layers, the linear expansion coefficient of the printed material body 6 refers to the linear expansion coefficient of the layer with the highest linear expansion coefficient among the multiple layers constituting the printed material body 6.

[Structure of Optical Element]

FIG. 2A is a plan view illustrating an example of the structure of an optical element according to the first embodiment of this technique. FIG. 2B is a plan view illustrating an enlarged part of the optical element shown in FIG. 2A. FIG. 2C is a cross-sectional view along tracks T1, T3, . . . in FIG. 2B. FIG. 2D is a cross-sectional view along tracks T2, T4, . . . in FIG. 2B. Hereinafter, two directions orthogonal to each other in the plane of the principal surface of the optical element 1 are respectively referred to as the X-axis direction and the Y-axis direction, and the direction perpendicular to the principal surface is referred to as the Z-axis direction.

The optical element 1 includes a substrate 2 with a principal surface, and multiple structures 3 arranged on the principal surface of the substrate 2. The structures 3 and the substrate 2 are formed separately, or formed integrally. When the structures 3 and the substrate 2 are formed separately, a base layer 4 may be included between the structures 3 and the substrate 2, if necessary. The base layer 4 is a layer integrally formed with the structures 3 at the bottom side of the structures 3, and obtained by curing an energy line curable resin composition or the like similar to the structures 3. The optical element 1 preferably has flexibility. This is because the optical element 1 can be easily attached to the printed paper body 6. The optical element 1 is preferably an optical sheet in terms of flexibility.

The substrate 2 and structures 3 included in the optical element 1 will be sequentially described below.

(Substrate)

The substrate 2 is, for example, a transparent substrate. While materials for the substrate 2 include, for example, transparent synthetic resins such as polycarbonate (PC) and polyethylene terephthalate (PET), and inorganic materials containing glass or the like as a main constituent, the substrate 2 is not to be considered particularly limited to these materials. While examples of the substrate 2 can include, for example, sheets, plates, and blocks, the substrate 2 is not to be considered particularly limited to these examples. The sheets herein are defined as including films. While the shape of the substrate 2 is not to be considered particularly limited, it is preferable to appropriately select the shape so as to follow the surface shape of the printed paper body 6 or the like to which the optical element 1 is applied.

(Structure)

The engineers have found, as a result of earnest studies, that when the material forming the structures has elasticity, the structures are deformed to extrude contamination penetrated between the structures in wiping, and the deformation allows for easy water wiping of contamination.

In order to extrude contamination penetrated between the structures by the deformation of the structures, there is a need to bring adjacent structures close to each other. The elastic modulus of the material forming the structures and the aspect ratio of the structures are important in order to deform the structures and eliminate the space between the structures. In addition, the contact angle is important in the water wiping. Therefore, the engineers have found, as a result of earnest studies through experiments, that the removal of contamination is easily possible as long as the elastic modulus, aspect ratio, and contact angle fall within predetermined ranges.

When what is considered necessary is to deform the structures, wiping is considered possible in principle as long as the pressure for the wiping is progressively increased, even in the case of a material with a high elastic modulus. However, in the case of a material that is not elastic, wiping at such a pressure that deforms the structures snaps the structures, or causes a plastic deformation. As a result, the reflectivity after wiping off is higher than the reflectivity before the adhesion of fingerprints.

The "dry wiping and water wiping available" means that the reflectivity before the adhesion of contamination such as fingerprints is consistent with, or generally consistent with that after wiping off fingerprints and the like, when the contamination is removed in a common wiping way.

The structures 3 have a convex shape with respect to the surface of the substrate 2. The elastic modulus of the material forming the structures 3 is preferably 1 MPa or more and 1200 MPa or less, and preferably 5 MPa or more and 1200 MPa or less. The elastic modulus less than 1 MPa attaches adjacent structures to each other in a transfer step to cause the structures 3 into a shape different from a desired shape, thereby resulting in a failure to achieve desired reflection characteristics. The elastic modulus in excess of 1200 MPa makes adjacent structures less likely to be brought into contact with each other in wiping, thus failing to extrude contamination and the like penetrated between the structures.

The dynamic friction coefficient of the substrate surface with the multiple structures 3 formed thereon is preferably 0.85 or less. The dynamic friction coefficient of 0.85 or less can suppress stickiness of the surface, and prevent adjacent structure from adhering to each other. Therefore, the decrease of reflection characteristics can be suppressed.

The structures 3 preferably contain silicone and urethane. Specifically, the structures 3 are preferably composed of a copolymer of an energy line curable resin composition containing a silicone acrylate and an urethane acrylate. The silicone contained in the structures 3 can reduce the adjacent MOTH-EYE attachment and the dynamic friction coefficient. The urethane contained in the structures 3 achieves flexible structures 3, thereby making material designs possible in the range of 1 MPa to 1200 MPa.

The multiple structures 3 have such an arrangement that forms multiple rows of tracks T1, T2, T3, . . . (hereinafter, also collectively referred to as "tracks T") on the surface of the substrate 2. In this technique, the track refers to a series of rows of structures 3. As the shapes of the tracks T, linear shapes, arc-like shapes, etc. can be used, and the tracks T in these shapes may be wobbled (meandering). These wobbled tracks T can suppress the generation of unevenness in appearance.

In the case of wobbling the track T, the wobbles for each track T on the substrate 2 are preferably synchronized. More specifically, the wobbles are preferably synchronized wobbles. This synchronization of the wobbles can maintain the unit grid shape of a hexagonal grid or a quasi-hexagonal grid, and keep the packing ratio high. The wave shapes of the wobbled tracks T include, for example, a sine wave and a triangle wave. The wave shapes of the wobbled tracks T are not to be considered limited to periodic wave shapes, and may be aperiodic wave shapes. The wobble amplitudes of the wobbled tracks T is selected, for example, on the order of ±10 µm.

Figure 3:
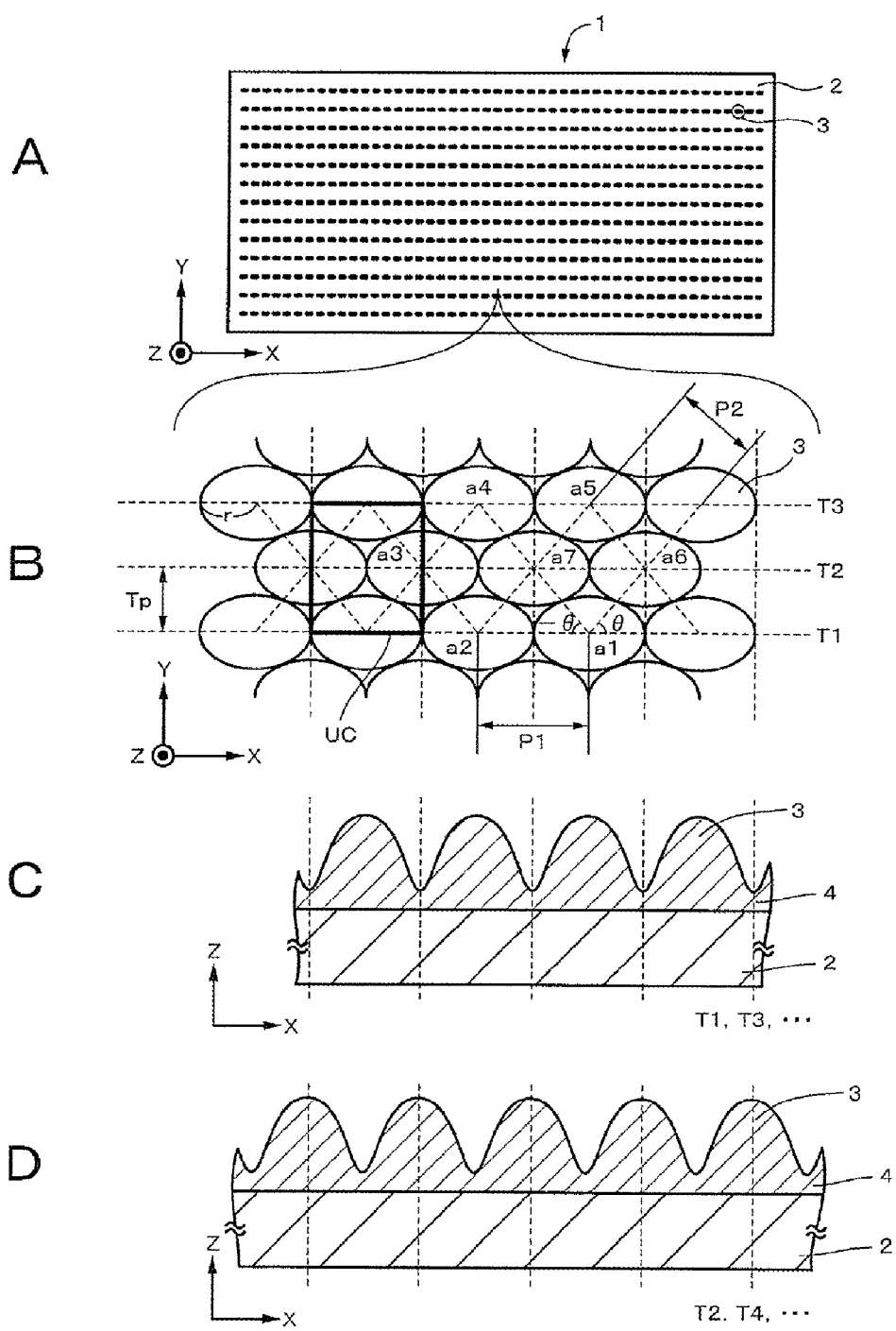
FIG. 3A is a plan view illustrating an example of the structure of an optical element according to the first embodiment of this technique.
FIG. 3B is a plan view illustrating an enlarged part of the optical element shown in FIG. 3A.
FIG. 3C is a cross-sectional view along tracks T1, T3, . . .
FIG. 3D is a cross-sectional view along tracks T2, T4, . . .

The structures 3 are, for example, located in positions shifted by half the pitch between two adjacent tracks T. Specifically, between two adjacent tracks T, the structures 3 for one track (for example, T2) are arranged in intermediate positions (positions shifted by half the pitch) of the structures 3 arranged for the other track (for example, T1). As a result, as shown in FIG. 3B, the structures 3 are arranged so that a hexagonal grid pattern or a quasi-hexagonal grid pattern with the centers of the structures 3 located on respective points of a1 to a7 is formed among three adjacent rows of tracks (T1 to T3).

The hexagonal grid herein refers to a regular hexagonal grid. The quasi-hexagonal grid refers to a distorted regular hexagonal grid unlike the regular hexagonal grid. For example, when the structures 3 are arranged on straight lines, the quasi-hexagonal grid refers to a hexagonal grid distorted by elongating the regular hexagonal grid in the direction of the linear arrangement (track direction). When the structures 3 are arranged in a meandering fashion, the quasi-hexagonal grid refers to a hexagonal grid obtained by straining a regular hexagonal grid with the meandering arrangement of the structures 3, or a hexagonal grid strained by drawing a regular hexagonal grid in the linear arrangement direction (the track direction) and strained with the meandering arrangement of the structures 3.

When the structures 3 are arranged to so as to form a quasi-hexagonal grid pattern, the arrangement pitch P1 of the structures 3 (for example, the distance between a1 and a2) in the same track (for example T1) is preferably longer than the arrangement pitch of the structures 3 between two adjacent tracks (for example, T1 and T2), that is, the arrangement pitch P2 of the structures 3 (for examples, the distance between a1 to a7 or a2 to a7) in a ±θ direction with respect to the extending direction of the track, as shown in FIG. 3B. This arrangement of the structures 3 allows for a further improvement in the packing density of the structures 3.

While specific shapes of the structures 3 include, for example, cone shapes, columnar shapes, needle-like shapes, hemispherical shapes, semi-elliptical shapes, and multiangular shapes, the structures 3 are not to be considered limited to these shapes, and other shapes may be adopted. While the cone shapes include a cone shape with a pointed top, a cone shape with a flat top, and a come shape with a top including a convex or concave surface, the structures 3 are not to be considered limited to these shapes. Examples of the cone shape with a convex curved surface at the top include shapes with two-dimensional curved surfaces such as a shape with a paraboloidal surface. In addition, the cones of the cope shapes may be curved into a concave shape or a convex shape. In the case of preparing a roll master with the use of a roll master exposure apparatus as will be described later (see FIG. 6), it is preferable to adopt, as the shape of the structure 3, an elliptic cone shape with a convex curved surface at the top or an elliptic conical trapezoid shape with a flat top, and conform the long-axis directions of the elliptic shapes forming the bottoms to the extending direction of the track T.

Figure 4:
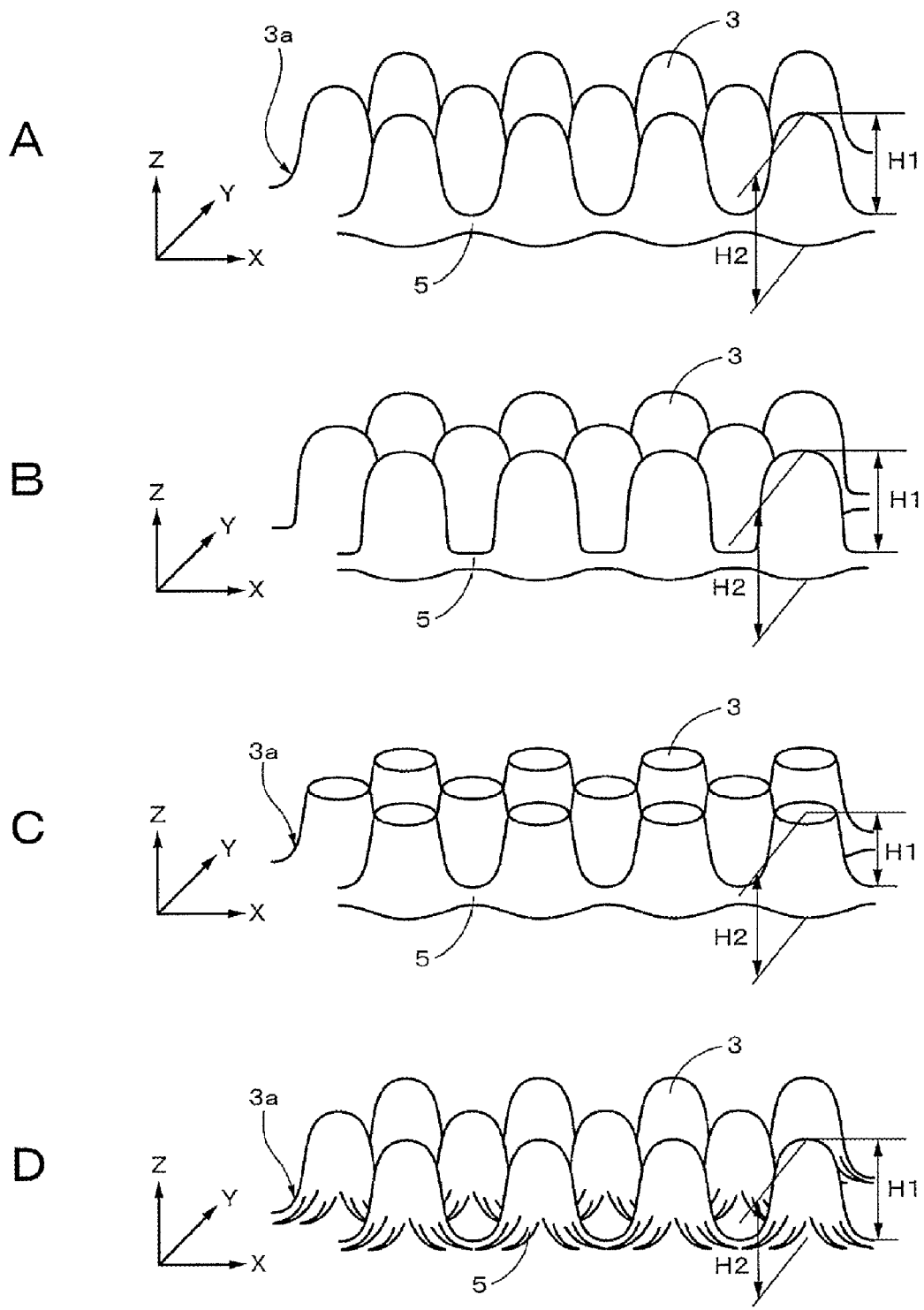
FIG. 4A is a perspective view illustrating a shape example of structures of an optical element.
FIG. 4B is a perspective view illustrating a shape example of structures of an optical element.
FIG. 4C is a perspective view illustrating a shape example of structures of an optical element.
FIG. 4D is a perspective view illustrating a shape example of structures of an optical element.

From the perspective of improvement in reflection characteristics, a cone shape is preferred which has a gentle slope at the top and a gradually steep slope from the central portion to the bottom as shown in FIG. 4A. In addition, from the perspective of improvement in reflection characteristics and transmission characteristics, preferred is a cone shape with a slope in a central portion steeper than those at the bottom and top as shown in FIG. 4B, or a cone shape with a flat top as shown in FIG. 4C. When the structures 3 have an elliptic cone shape or an elliptic conical trapezoid shape, the direction of the long axis at the bottom is preferably parallel to the direction of extending the tracks.

The structures 3 preferably have, at the peripheral edges of the bottoms, a curved surface 3a gently decreasing the height in the direction from the top toward the bottom as shown in FIGS. 4A and 4C. This is because it is possible to easily detach the optical element 1 from a master or the like in the process of producing the optical element 1. It is to be noted that while the peripheral edge of the structures 3 may be only partially provided with the curved surface 3a, it is preferable to provide the curved surface 3a over the entire peripheral edge of the structures 3 from the perspective of improvement in detachment characteristics.

The periphery of structures 3 is preferably provided partially or entirely with a projection 7. This is because the reflectivity can be kept low, even when the packing ratio of the structures 3 is low. The projection 7 is preferably provided between adjacent structures 3 as shown in FIGS. 4A to 4C, in terms of ease of forming. Alternatively, as shown in FIG. 4D, an elongate projection 7 may be provided entirely or partially on the periphery of the structures 3. While this elongate projection 7 can, for example, extend in the direction from the top of the structure 3 toward the bottom thereof, the projection 7 is not to be considered particularly limited to this extension. While examples of the shape of the projection 7 can include triangular shape in cross section and rectangular shape in cross section, the shape is not to be considered particularly limited to these shapes, and can be selected in consideration of ease of forming, etc. In addition, the surface may be partially or entirely roughened at the periphery of the structures 3 to form fine asperity. Specifically, for example, the surface between adjacent structures 3 may be roughened to form fine asperity. Furthermore, the surfaces, for example, tops of the structures 3 may have minute holes formed therein.

It is to be noted that while the respective structures 3 each have the same size, shape, and height in FIGS. 3A to 4D, the shapes of the structures 3 are not to be considered limited thereto, and the structures 3 which have two or more types of sizes, shapes, and heights may be formed on the surface of the substrate.

The structures 3 are, for example, two-dimensionally arranged in a regular (periodic) manner at short arrangement pitch not longer than the wavelength band of light for the purpose of reduction in reflection. This two-dimensional arrangement of the multiple structures 3 may form a two-dimensional wavefront on the surface of the substrate 2. The arrangement pitch herein means an arrangement pitch P1 and an arrangement pitch P2. The wavelength band of light for the purpose of reduction in reflection is, for example, the wavelength band of ultraviolet light, the wavelength band of visible light, or the wavelength band of infrared light. In this case, the wavelength band of ultraviolet light refers to a wavelength band of 10 nm to 360 nm, the wavelength band of visible light refers to a wavelength band of 360 nm to 830 nm, and the wavelength band of infrared light refers to a wavelength band of 830 nm to 1 mm. Specifically, the arrangement pitch is preferably 175 nm or more and 350 nm or less. The arrangement pitch less than 175 nm has a tendency to make it difficult to prepare the structures 3. On the other hand, the arrangement pitch in excess of 350 nm has a tendency to cause diffraction of visible light.

The height H1 of the structure 3 in the extending direction of the track is preferably smaller than the height H2 of the structure 3 in the row direction. More specifically, the heights H1 and H2 of the structures 3 preferably satisfy the relationship of H1 <H2. This is because, when the structures 3 are arranged so as to satisfy the relationship of H1≥H2, there is a need to lengthen the arrangement pitch P1 in the extending direction of the track, thus decreasing the packing ratio of the structures 3 in the extending direction of the track. This decrease in packing ratio will lead to decreased reflection characteristics.

The heights of the structures 3 are not particularly limited, but appropriately set depending on the wavelength range of transmitted light, and set in the range of, for example, 236 nm or longer and 450 nm or shorter, preferably 415 nm or longer and 421 nm or shorter.

The aspect ratio (height H/arrangement pitch P) of the structures 3 preferably falls within the range of 0.6 or more and 5 or less, more preferably 0.6 or more and 4 or less, and most preferably 0.6 or more and 1.5 or less. The aspect ratio less than 0.6 has a tendency to decrease the reflection characteristics and the transmission characteristics. On the other hand, the aspect ratio in excess of 5 has a tendency to decrease the transferablity, even when a treatment for improving the mold release property is applied by coating the master with fluorine and adding an additive such as a silicone-based additive material or a fluorine-based additive material to a transfer resin. In addition, when the aspect ratio exceeds 4, there is no large change in luminous reflectance, and thus, the aspect ratio is preferably 4 or less considering both perspectives of improvement in luminous reflectance and ease of mold release. The aspect ratio in excess of 1.5 has a tendency to decrease the transferability, when the treatment for improvement in the mold release property is not applied as described above.

In addition, the aspect ratio of the structures 3 is preferably set in the range of 0.94 or more and 1.46 or less in terms of further improvement in reflection characteristics. In addition, the aspect ratio of the structures 3 is preferably set in the range of 0.81 or more and 1.28 or less in terms of further improvement in transmission characteristics.

It is to be noted that the aspect ratio of the structures 3 is not limited to a case where the structures 3 are all identical, and the respective structures 3 may be structured so as to have a certain height distribution (for example, in the range on the order of 0.83 to 1.46 in terms of aspect ratio). The wavelength dependence of the reflection characteristics can be reduced by providing the structures 3 which have the height distribution. Therefore, the optical element 1 can be achieved which has excellent antireflection characteristics.

The height distribution herein means that the structures 3 which have two or more types of heights are provided on the surface of the substrate 2. For example, the structures 3 which have a reference height and the structures 3 which have a different height from the reference height of the structures 3 may be provided on the surface of the substrate 2. In this case, the structures 3 which have a different height from the reference are provided, for example, in a periodic or aperiodic (random) manner on the surface of the substrate 2. Examples of the direction of the periodicity include, for example, the extending direction of the track and the row direction.

It is to be noted that the aspect ratio is defined by the following formula (1) in this technique.

$$\text{Aspect Ratio} = H/P \quad (1)$$

where H: structure height, P: average arrangement pitch (average period)

The average arrangement pitch P herein is defined by the following formula (2).

$$\text{Average Arrangement Pitch } P = (P1 + P2 + P2)/3 \quad (2)$$

However, P1: the arrangement pitch in the extending direction of the track (the period in the extending direction of the track); P2: the arrangement pitch in a $\pm\theta$ direction (where $\theta = 60° - \delta$; $\delta$ is preferably $0° < \delta \leq 11°$, more preferably $3° \leq \delta < 6°$ with respect to the extending direction of the track ($\theta$-direction period).

In addition, the height H of the structure 3 is regarded as the height in the row direction of the structure 3. The height of the structure 3 in the track extending direction (X direction) is smaller than the height thereof in the row direction (Y direction), in addition, the height of the structure 3 other than in the track extending direction is substantially equal to the height in the row direction, and the height of the sub-wavelength structure is thus typified by the height in the row direction. However, when the structure 3 is concave, the height H of the structure in the formula (1) mentioned above is regarded as the depth H of the structure.

The ratio P1/P2 preferably satisfies the relationship of $1.00 \leq P1/P2 \leq 1.1$ or $1.00 < P1/P2 \leq 1.1$ where the arrangement pitch of the structures 3 in the same track and the arrangement pitch of the structures 3 between two adjacent tracks are respectively denoted by P1 and P2. This numerical range can improve the packing ratio of the structures 3 which have the shape of an elliptic cone or an elliptic conical trapezoid, and thus improve the antireflection characteristics.

The packing ratio of the structures 3 on the substrate surface falls, with 100% as an upper limit, within the range of 65% or more, preferably 73% or more, and more preferably 86% or more. The packing ratio in this range can improve the antireflection characteristics. In order to improve the packing ratio, it is preferable to join or overlap the bottoms of adjacent structures 3 to or with each other, or provide the structures 3 with distortion by adjusting the ellipticity of the structure bottoms.

In this case, the packing ratio (average packing ratio) of the structures 3 is a value obtained in the following way.

First, the surface of the optical element 1 is photographed in Top View with the use of a scanning electron microscope (SEM: Scanning Electron Microscope). Next, unit grids Uc are drawn at random from the taken SEM photograph, and the arrangement pitch P1 and track pitch Tp are measured for the unit grids Uc (see FIG. 3B). In addition, the bottom area S of the structure 3 located in the center of the unit grid Uc is measured by image processing. Next, the packing ratio is figured out from the following formula (3) with the use of the measured arrangement pitch P1, track pitch Tp, and bottom area S.

$$\text{Packing Ratio} = (S(\text{hex.})/S(\text{unit})) \times 100 \quad (3)$$

Unit Grid Area: $S(\text{unit}) = P1 \times 2Tp$

Bottom Area of Structure in Unit Grid: $S(\text{hex.}) = 2S$

The unit grids at 10 points drawn at random from the taken SEM photograph are subjected to the above-described processing for calculating packing ratio. Then, the average (arithmetic mean) of the measurement values is simply figured out to the average ratio for the packing ratio, and this average ratio is regarded as the packing ratio of the structures 3 on the substrate surface.

When the structures 3 have an overlap with each other, or when there is a sub-structure such as a projection 4 between the structures 3, the packing ratio can be figured out by a method in which an area ratio is determined by regarding, as a threshold, a part corresponding to 5% of the height of the structure 3.

The structures 3 are preferably connected in such a way that the bottoms thereof are overlapped with each other. Specifically, the bottoms of the structures 3 in an adjacent relationship are preferably partially or entirely overlapped with each other, and preferably overlapped with each other in the track direction, $\theta$ direction, or both of the directions. The bottoms of the structures 3 overlapped with each other as described above can improve the packing ratio of the structures 3. The structures are preferably overlapped with each other at ¼ or less of the maximum value in the light wavelength band under a usage environment with an optical path length in consideration of refractive index. This is because excellent antireflection characteristics can be achieved.

The ratio $((2r/P1) \times 100)$ of a radial length 2r to the arrangement pitch P1 is 85% or more, preferably 90% or more, and more preferably 95% or more. This is because this range can improve the packing ratio of the structures 3 and improve the antireflection characteristics. If the ratio $((2r/P1) \times 100)$ is increased to excessively increase the overlaps between the structures 3, there is a tendency to decrease the antireflection characteristics. Therefore, the upper limit of the ratio $((2r/P1) \times 100)$ is preferably set so that the structures are joined to each other at ¼ or less of the maximum value in the light wavelength band under a usage environment with an optical path length in consideration of refractive index. In this case, the arrangement pitch P1 refers to the arrangement pitch of the structures 3 in the track direction as shown in FIG. 3B, whereas the radial length 2r refers to the radial length of the structure bottom in the track direction as shown in FIG. 3B. It is to be noted that the radial length 2r serves as a diameter when the structure bottom is circular, whereas the radial length 2r serves as a longer diameter when the structure bottom is elliptical.

The difference in refractive index between the optical element 1 and the attachment layer 5 is preferably 0.1 or less. This is because Fresnel reflections at the interfaces can be suppressed to improve the visibility. The difference in refractive index between the structures 3 and the substrate 2 and the difference in refractive index between the substrate 2 and the attachment layer 5 is preferably 0.1 or less. This is because Fresnel reflections at the interfaces can be suppressed to improve the visibility. The surface roughness Rz of the optical element 1 is preferably 1.7 μm or less. This is because a beautiful appearance can be obtained.

The back surface of the substrate 2 preferably satisfies the relationships of: $L^* \geq 95$; $|b^*| \leq 0.53$; and $|a^*| \leq 0.05$ in transmission hue in the $L^*a^*b^*$ system. This is because coloring of the optical element 1 can be suppressed, and the visibility of the printed material surface can be thus improved. The back surface of the optical element 1 preferably satisfies the relationships of: $L^* \geq 96$; $|b^*| \leq 1.9$; and $|a^*| \leq 0.7$ in transmission hue in the $L^*a^*b^*$ system. This is because coloring of the optical element 1 can be suppressed, and the visibility of the printed material surface can be thus improved.

[Configuration of Roll Master]

Figure 5:
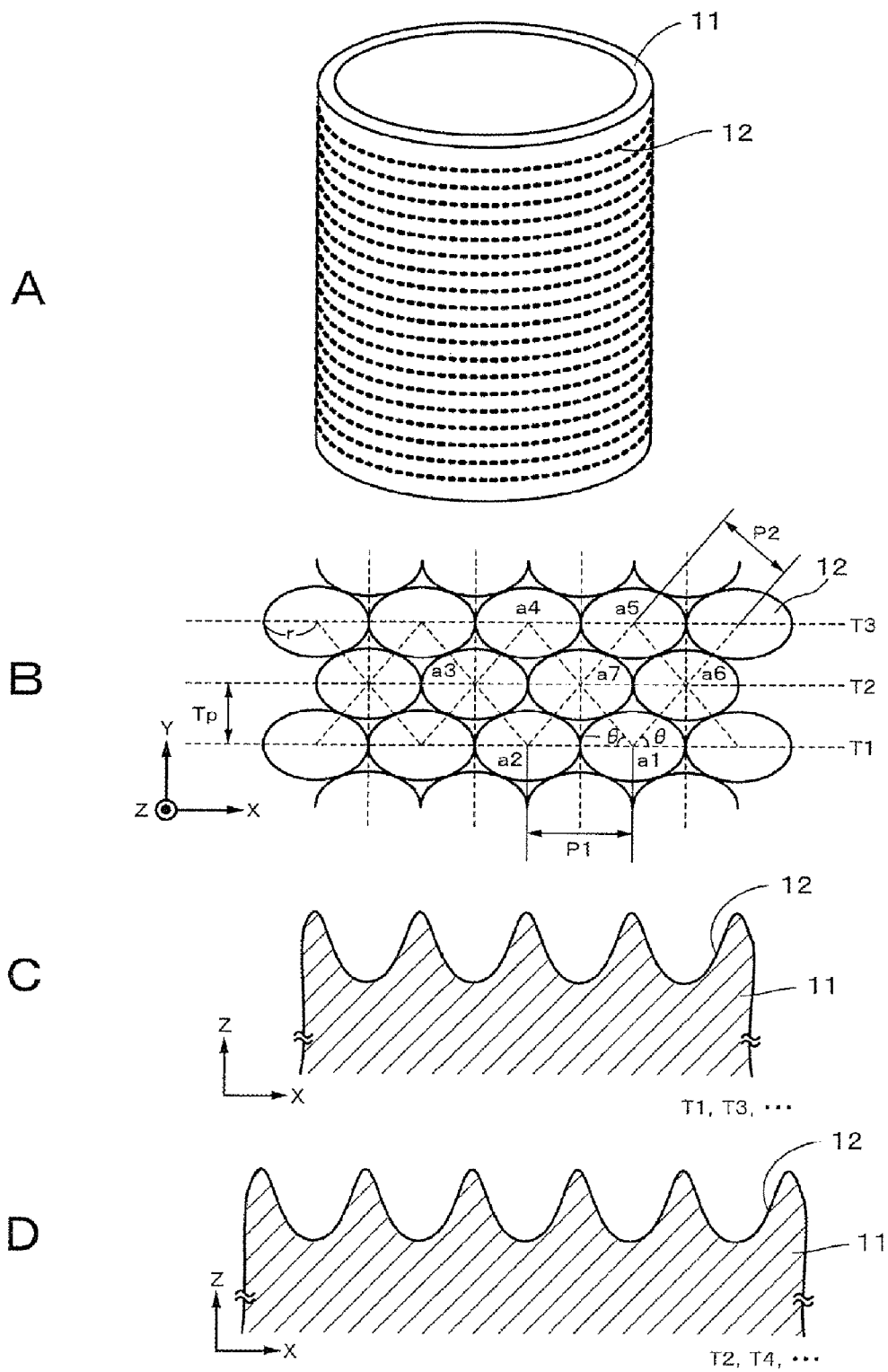
FIG. 5A is a perspective view illustrating an example of the structure of a roll master.
FIG. 5B is a plan view illustrating an enlarged part of the roll master shown in FIG. 4A.
FIG. 5C is a cross-sectional view along tracks T1, T3, . . .
FIG. 5D is a cross-sectional view along tracks T2, T4, . . .

FIG. 5A is a perspective view illustrating an example of the structure of a roll master. FIG. 5B is a plan view illustrating an enlarged part of the roll master shown in FIG. 5A. FIG. 5C is a cross-sectional view along tracks T1, T3, ... in FIG. 5B. FIG. 5D is a cross-sectional view along tracks T2, T4, ... in FIG. 5B. The roll master 11 is a master for forming the multiple structures 3 on the substrate surface described above. The roll master 11 has, for example, a columnar shape or a cylindrical shape, and the columnar surface or the cylindrical surface is used as a formation surface for forming the multiple structures 3 on the substrate surface. Multiple structures 12 are two-dimensionally arranged on this formation surface. The structures 12 have, for example, a concave shape with respect to the formation surface. While glass, for example, can be used as the material of the roll master 11, the material is not to be considered particularly limited to this glass material.

The multiple structures 12 arranged on the formation surface of the roll master 11 and the multiple structures 3 arranged on the surface of the substrate 2 have an inversion relation of convex and concave. More specifically, the structures 12 on the roll master 11 have the same shape, arrangement, and arrangement pitch as those of the structures 3 on the substrate 2.

[Structure of Exposure Apparatus]

Figure 6:
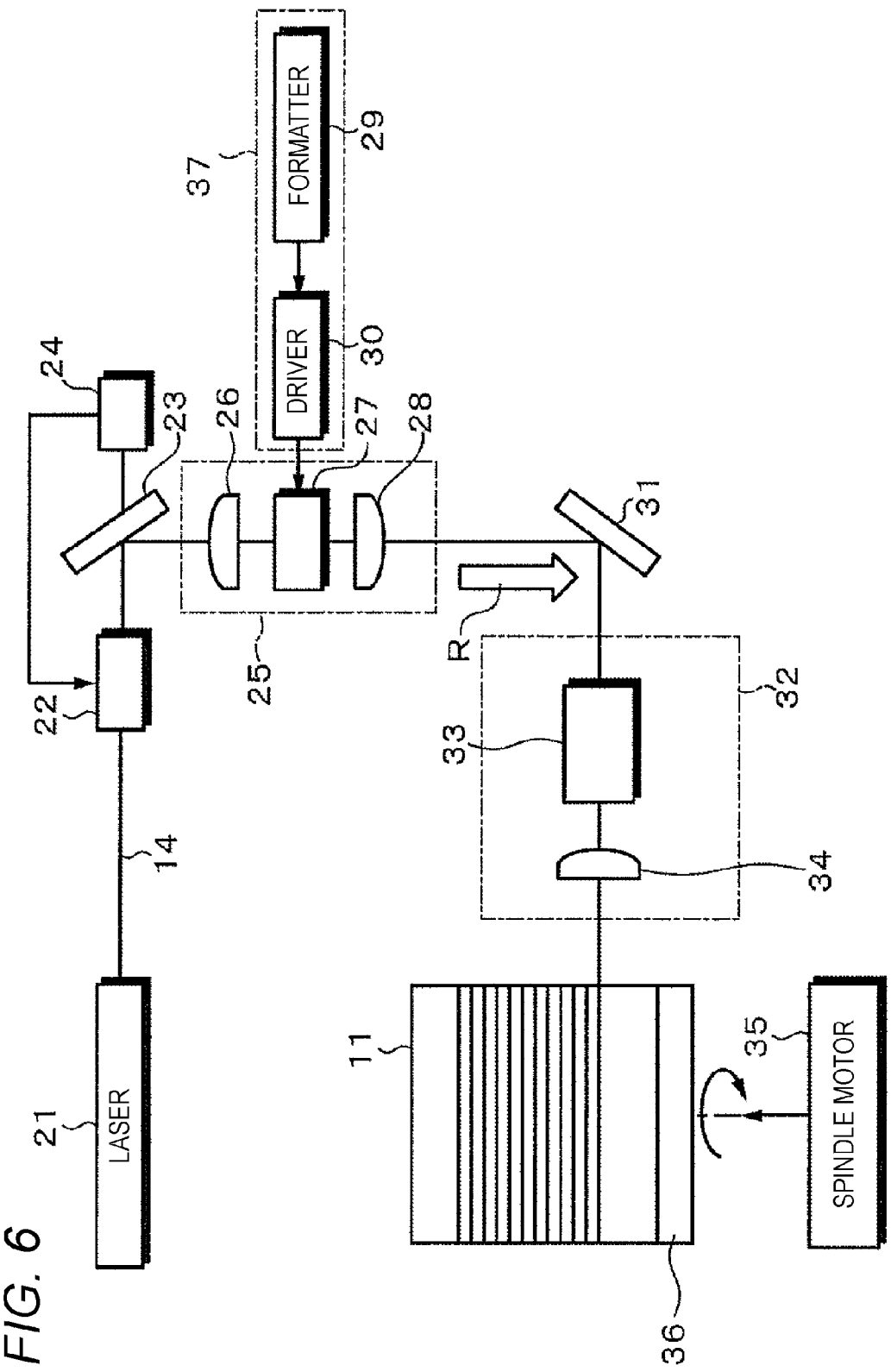
FIG. 6 is a schematic diagram illustrating an example of the structure of a roll master exposure apparatus.

FIG. 6 is a schematic diagram illustrating an example of the structure of a roll master exposure apparatus for preparing the roll master. This roll master exposure apparatus has a structure based on an optical disc recording apparatus.

A laser light source 21 is a light source for exposing a resist film deposited on the surface of the master roll 11 as a recording medium, and intended to emit recording laser light 14 of, for example, wavelength λ=266 nm. The laser light 14 outgoing from the laser light source 21 travels straight directly as collimated beams, and enters an electro optical element (EOM: Electro Optical Modulator) 22. The laser light 14 transmitting through the electro optical element 22 is reflected by a mirror 23, and guided into a modulation optical system 25.

The mirror 23 is composed of a polarization beam splitter, which has the function of reflecting one polarization component and transmitting the other polarization component. The polarization component transmitting through the mirror 23 is received by a photodiode 24, the electro optical element 22 is controlled on the basis of the received signal to modulate the phase of the laser light 14.

In the modulation optical system 25, the laser light 14 is collected by a collecting lens 26 into an acousto-optic element (AOM: Acousto-Optic Modulator) 27 composed of glass ($SiO_2$) or the like. The laser light 14 is intensity-modulated to diffuse by the acousto-optic element 27, and then collimated by a lens 28. The laser light 14 outgoing from the modulation optical system 25 is reflected by a mirror 31, and horizontally and parallel guided onto a moving optical table 32.

The moving optical table 32 includes a beam expander 33 and an objective lens 34. The laser light 14 guided to the moving optical table 32 is shaped by the beam expander 33 into a desired beam shape, and then passed through the objective lens 34 to irradiate the resist layer on the roll master 11. The roll master 11 is placed on a turn table 36 connected to a spindle motor 35. Then, the step of exposing the resist layer is carried out by intermittently irradiating the resist layer with the laser light 14 while rotating the roll master 11 and moving the laser light 14 in the height direction of the roll master 11. The latent image formed has a substantially elliptical shape with a long axis in a circumferential direction. The laser light 14 is moved by the movement of the moving optical table 32 in the direction of an arrow R.

The exposure apparatus includes a control mechanism 37 for forming, on the resist layer, a latent image corresponding to the two-dimensional pattern of the hexagonal grid or quasi-hexagonal grid shown in FIG. 2B. The control mechanism 37 includes a formatter 29 and a driver 30. The formatter 29 includes a polarity reversal unit, and this polarity reversal unit controls the timing of irradiating the resist layer with the laser light 14. The driver 30 controls the acousto-optic element 27 in response to the output from the polarity reversal unit.

In this roll master exposure apparatus, so as to spatially link the two-dimensional pattern, a polarity reversal formatter signal is synchronized with a rotating controller to generate a signal for each track, and the signal is intensity-modulated by the acousto-optic element 27. A hexagonal grid or quasi-hexagonal grid pattern can be recorded by patterning with an appropriate number of rotations, an appropriate modulation frequency, and an appropriate feed pitch at constant angular velocity (CAV).

[Method for Producing Printed Material]

Next, a method for producing the optical element 1 according to the first embodiment of this technique will be described with reference to FIGS. 7A through 8C.

(Resist Deposition Step)

First, as shown in FIG. 7A, the columnar or cylindrical roll master 11 is prepared. This roll master 11 is, for example, a glass master. Next, as shown in FIG. 7B, a resist layer 13 is formed on the surface of the roll master 11. For example, any of an organic resist and an inorganic resist may be used as the material of the resist layer 13. For example, a novolac resist and a chemically-amplified resist can be used as the organic resist. In addition, one, or two or more metal compounds can be used as the inorganic resist.

(Exposure Step)

Next, as shown in FIG. 7C, the resist layer 13 formed on the surface of the roll master 11 is irradiated with the laser light (exposure beam) 14. Specifically, while the roll master 11 is rotated which is placed on the turn table 36 of the roll master exposure apparatus shown in FIG. 6, the resist layer 13 is irradiated with the laser light (exposure beam) 14. In this case, the resist layer 13 is exposed over the entire surface by intermittent irradiation with the laser light 14 while moving the laser light 14 in the height direction of the roll master 11 (in a direction parallel to the central axis of the columnar or cylindrical roll master 11). Thus, a latent image 15 in accordance with the trajectory of the laser light 14 is formed over the entire surface of the resist layer 13 at a pitch, for example, comparable to the wavelength of visible light.

The latent image 15 is arranged, for example, so as to make multiple rows of tracks on the surface of the roll master surface, and forms a hexagonal grid pattern or a quasi-hexagonal grid pattern. The latent image 15 has, for example, an elliptical shape with a long-axis direction in the extending direction of the track.

(Development Step)

Next, for example, while rotating the roll master 11, a developer was delivered by drops onto the resist layer 13 to develop the resist layer 13. Thus, as shown in FIG. 7D, multiple openings are formed in the resist layer 13. When the resist layer 13 is formed from a positive resist, a pattern corresponding to the latent image (exposed section) 16 is formed in the resist layer 13 as shown in FIG. 7D, because the dissolution rate in the developer is increased in the exposed section exposed to the laser light 14 as compared with the non-exposed section. The pattern of the openings is a predetermined grid pattern such as, for example, a hexagonal grid pattern or a quasi-hexagonal grid pattern.

(Etching Step)

Next, the surface of the roll master 11 is etched with, as a mask, the pattern of the resist layer 13 (resist pattern) formed on the roll master 11. Thus, as shown in FIG. 8A, concave portions, that is, structures 12 can be obtained which have an elliptic cone shape or an elliptic conical trapezoid shape with a long-axis direction in the extending direction of a track. As the etching, dry etching and wet etching can be used. In this case, a pattern of cone structures 12 can be formed by alternately carrying out etching and ashing.

As described above, the intended roll master 11 is obtained.

(Transfer Step)

Next, as shown in FIG. 8B, after closely attaching the roll master 11 to a transfer material 16 applied onto a substrate 2, the transfer material 16 is irradiated with an energy line such as ultraviolet light from an energy line source 17 to cure the transfer material 16, and the substrate 2 coupled with the cured transfer material 16 is then detached. Thus, as shown in FIG. 8C, an optical element 1 is prepared which has multiple structures 3 on the substrate surface.

The energy line source 17 is not to be considered particularly limited as long as it is possible for the energy line source 17 to emit an energy line such as electron beams, ultraviolet light, infrared light, laser beams, visible light, ionizing radiation (X-ray, α-ray, β-ray, γ-ray, etc.), microwaves, or high-frequency waves.

It is preferable to use an energy line curable resin composition as the transfer material 16. It is preferable to use an ultraviolet curable resin composition as the energy line curable resin composition. The energy line curable resin composition may contain a filler or a functional additive, if necessary.

The energy line curable resin composition preferably contain a silicone acrylate, an urethane acrylate, other polymeric oligomer, a monofunctional monomer, a bifunctional monomer, a multifunctional monomer, and an initiator. An acrylate having two or more acrylate polymerizable unsaturated groups in a side chain, at a terminal, or both in one molecule can be used as the silicone acrylate. One or more of (meth)acryloyl groups and (meth)acryloyloxy groups can be used as the acrylate polymerizable unsaturated groups. However, the term of (meth)acryloyl group is used to mean an acryloyl group and a methacryloyl group.

Examples of the silicone acrylate and methacrylate include, for example, polydimethylsiloxane having an organic modified acrylic group. Examples of the organic modification include a polyether modification, a polyester modification, an arachyl modification, and a polyether/polyester modification. Specific examples include SILAPLANE FM7725 from Chisso Corporation, EB350 and EB1360 from DAICEL-CYTEC Company, Ltd., and EGORad 2100, TEGORad 2200 N, TEGORad 2250, TEGORad 2300, TEGORad 2500, and TEGORad 2700 from Degussa.

An acrylate having two or more acrylate polymerizable unsaturated groups in a side chain, at a terminal, or both in one molecule can be used as the urethane acrylate. One or more of (meth)acryloyl groups and (meth)acryloyloxy groups can be used as the acrylate polymerizable unsaturated groups. However, the term of (meth)acryloyl group is used to mean an acryloyl group and a methacryloyl group.

For example, an urethane acrylate, a methacrylate urethane, an aliphatic urethane acrylate, an aliphatic urethane methacrylate, an aromatic urethane acrylate, an aromatic urethane methacrylate, for example, functional urethane acrylate oligomer CN series from Sartomer Company Inc.: CN980, CN965, CN962, etc. can be used as the urethane acrylate.

Known oligomers can be used as the other polymeric oligomer, and can include, for example, a polyester acrylate oligomer, a polyester polyurethane acrylate oligomer, and an epoxy acrylate oligomer.

Examples of the monofunctional monomer can include, for example, carboxylic acids (acrylic acid), hydroxy acrylates (2-hydroxyethyl acrylate, 2-hydroxypropyl acrylate, 4-hydroxybutyl acrylate), alkyls, alicyclic acrylates (isobutyl acrylate, t-butyl acrylate, isooctyl acrylate, lauryl acrylate, stearyl acrylate, isobornyl acrylate, cyclohexyl acrylate), other functional monomers (2-methoxyethyl acrylate, methoxyethyleneglycol acrylate, 2-ethoxyethyl acrylate, tetrahydrofurfuryl acrylate, benzyl acrylate, ethyl carbitol acrylate, phenoxyethyl acrylate, N,N-dimethylaminoethyl acrylate, N,N-dimethylaminopropyl acrylamide, N,N-dimethylacrylamide, acryloylmorpholine, N-isopropylacrylamide, N,N-diethylacrylamide, N-vinylpyrrolidone, 2-(perfluorooctyl)ethyl acrylate, 3-perfluorohexyl-2-hydroxypropyl acrylate, 3-perfluorooctyl-2-hydroxypropyl acrylate, 2-(perfluorodecyl)ethyl acrylate, 2-(perfluoro-3-methylbutyl)ethyl acrylate), 2,4,6-tribromophenol acrylate, 2,4,6-tribromophenol methacrylate, 2-(2,4,6-tribromophenoxy)ethylacrylate), and 2-ethylhexyl acrylate.

Examples of the bifunctional monomer can include, for example, tri(propylene glycol)diacrylate, trimethylolpropane diallyl ether, and urethane acrylate.

Examples of the multifunctional monomer can include, for example, trimethylolpropane triacrylate, dipentaerythritol penta- and hexa-acrylates, and ditrimethylolpropane tetraacrylate.

The transfer material preferably contains a hydrophilic material. Examples of hydrophilic monomers can include acrylamide and derivative thereof, vinylpyrrolidone, and acrylic acid, methacrylic acid, and derivatives thereof, and copolymers containing a water-soluble monomer as a main constituent. For examples, the examples can include, but not limited to, N-methylacrylamide, N,N-dimethylacrylamide, acrylamide, acryloylmorpholine, 2-hydroxyethyl acrylate, N,N-dimethylaminoethyl acrylate, vinylpyrrolidone, 2-methacryloyloxyethyl phosphorylcholine, 2-methacryloyloxyethyl-D-glycoside, 2-methacryloyloxyethyl-D-mannoside, and vinyl methyl ether. In addition, a similar effect is achieved through the use of a material having a highly polar functional group, as typified by an amino group, a carboxyl group, and a hydroxyl group.

Moreover, while the hydrophilic polymer is not particularly limited, examples of the preferred main chain structure of the hydrophilic polymer include acrylic resins, methacrylic resins, polyvinyl acetal resins, polyurethane resins, polyurea resins, polyimide resins, polyamide resins, epoxy resins, polyester resins, synthetic rubbers, and natural rubbers, in particular, acrylic resins and methacrylic resins are preferred for the reason of excellent adhesion to general-purpose resins, and acrylic resins are more preferred in terms of curability, etc. The hydrophilic polymer may be copolymer.

Specific examples of the hydrophilic polymer can include known hydrophilic resins, and preferred is, for example, an acrylate or a methacrylate containing a hydroxyl group, or an acrylate or a methacrylate containing a repeating unit of ethylene glycol in the skeleton. More specific examples of the hydrophilic polymer can include methoxy polyethylene glycol monomethacrylate, ethoxylated hydroxyethyl methacrylate, polypropylene glycol monomethacrylate, polyethylene glycol diacrylate, polyethylene glycol dimethacrylate, ethoxylated bisphenol A dimethacrylate, and ethoxylated trimethylolpropane triacrylate.

Examples of the initiator can include, for example, 2,2-dimethoxy-1,2-diphenylethane-1-on, 1-hydroxy-cyclohexylphenylketone, and 2-hydroxy-2-methyl-1-phenylpropane-1-one.

For example, any of inorganic microparticles and organic microparticles can be used as the filler. The inorganic microparticles can include, for example, metal oxide microparticles such as $SiO_2$, $TiO_2$, $ZrO_2$, $SnO_2$, and $Al_2O_3$.

Examples of the functional additive can include, for example, leveling agents, surface conditioners, and antifoaming agents.

Materials for the substrate 2 include, for example, methyl methacrylate (co)polymer, polycarbonate, styrene (co)polymer, methyl methacrylate-styrene copolymer, cellulose diacetate, cellulose triacetate, cellulose acetate butyrate, polyester, polyamide, polyimide, polyether sulfone, polysulfone, polypropylene, polymethylpentene, polyvinyl chloride, polyvinyl acetal, polyether ketone, polyethylene terephthalate, polyethylene naphthalate, aramid, polyethylene, polyacrylate, acrylic resins, epoxy resins, urea resins, urethane resins such as polyurethane, melamine resins, cycloolefin polymers, and cycloolefin copolymers. Materials for the substrate 2 include quartz, sapphire, glass, and clay films in the case of inorganic materials.

When a polymer material is used as the material of the substrate 2, the thickness of the substrate 2 is preferably 3 to 500 μm in terms of productivity, but not to be considered particularly limited to this range.

Examples of the surface conditioner can include, for example, a surface lubricant. Examples of the surface lubricant can include known lubricants, and for example, polydimethyl silicone, fluorine-based additives, ester lubricants, and amide additives are preferred. In the case of imparting hydrophilicity, polyether-modified polydimethyl silicone series are preferred.

The method for forming the substrate 2 is not particularly limited, and the substrate 2 may be an injection-molded article, an extrusion-molded article, or a cast-molded article. If necessary, the substrate surface may be subjected to a surface treatment such as a corona treatment.

It is to be noted that in the case of preparing high-aspect-ratio structures 3 (for example, preparing structures 3 with an aspect ratio of greater than 1.5 and 5 or less, it is preferable to apply a mold release agent such as a silicone-based mold release agent or a fluorine-based mold release agent to the surface of the master such as the roll mater 11 in order to improve the mold release property of the master such as the roll master 11. Furthermore, it is preferable to add an additive agent such as a fluorine-based additive material or a silicone-based additive material to the transfer material 16.

(Attachment Step)

Next, as shown in FIG. 8D, the prepared optical element 1 is attached to the surface of the printed material body 6, with an attachment layer 5 interposed therebetween. This attachment provides the intended printed material 10. It is to be noted that the attachment layer 5 may be formed in advance on the back surface of the optical element 1. In this case, it is preferable to further provide a protective layer for protecting the attachment layer 5 on the surface of the attachment layer 5, detach the protective layer, and attach the attachment layer 5 to the surface of the printed material body 6. In the case of adopting the attachment layer 5 formed in advance on the back surface of the optical element 1 as described above, the attachment layer 5 preferably contains an adhesive agent as its main constituent.

According to the first embodiment, the reflection at the surface of the printed material 10 can be suppressed because the optical element 1 including the multiple structures 3 arranged at a fine pitch of not longer than the wavelength of visible light is attached to the printed material body 6. Therefore, the contrast can be improved in a printed image of the printed material 10. In addition, the structures 3 have an aspect ratio adjusted to 0.6 or more and 5 or less, the decreases in reflection characteristics and transmission characteristics can be thus suppressed, and the decrease in transferability of the structures 3 can be further suppressed.

When the elastic modulus of the structures 3 is adjusted to 1 MPa or more and 1200 MPa or less, preferably 5 MPa or more and 1200 MPa or less, the decrease in reflection characteristics can be suppressed which is caused by the adhesion of adjacent structures to each other, and contamination and the like penetrated between the structures 3 can be extruded and wiped off. In addition, when the surface of the optical element provided with the multiple structures 3 has a dynamic friction coefficient adjusted to 0.85 or less, the decrease in reflection characteristics can be suppressed which is caused by the adhesion of adjacent structures to each other.

The removal of contamination in the case of adhering to the surface of the optical element 1 produced in the way described above will be now described. FIGS. 16A to 16C are schematic diagrammatic views for explaining the removal of contamination in the case of adhering to the surface of the optical element 1. As shown in FIG. 16A, when a hand is touched to the surface of the optical element 1, contamination of fingerprints adheres between the structures 3. When an external force is applied to the surface of the optical element 1 in this state, due to the structures 3 with elasticity, the elastic deformation of the structures 3 brings adjacent elastic bodies 3 into contact with each other as shown in FIG. 16B. Thus, the contamination adhering between the structures 3 is extruded to the outside, and the contamination of fingerprints can be thus removed. Alternatively, in the case of water wiping, this deformation easily allows water to penetrate, thus removing the contamination. Then, as shown in FIG. 16C, after the wiping, the elastic force restores the shapes of the structures 3 to the original state.

<2. Second Embodiment>

[Structure of Optical Element]

Figure 9:
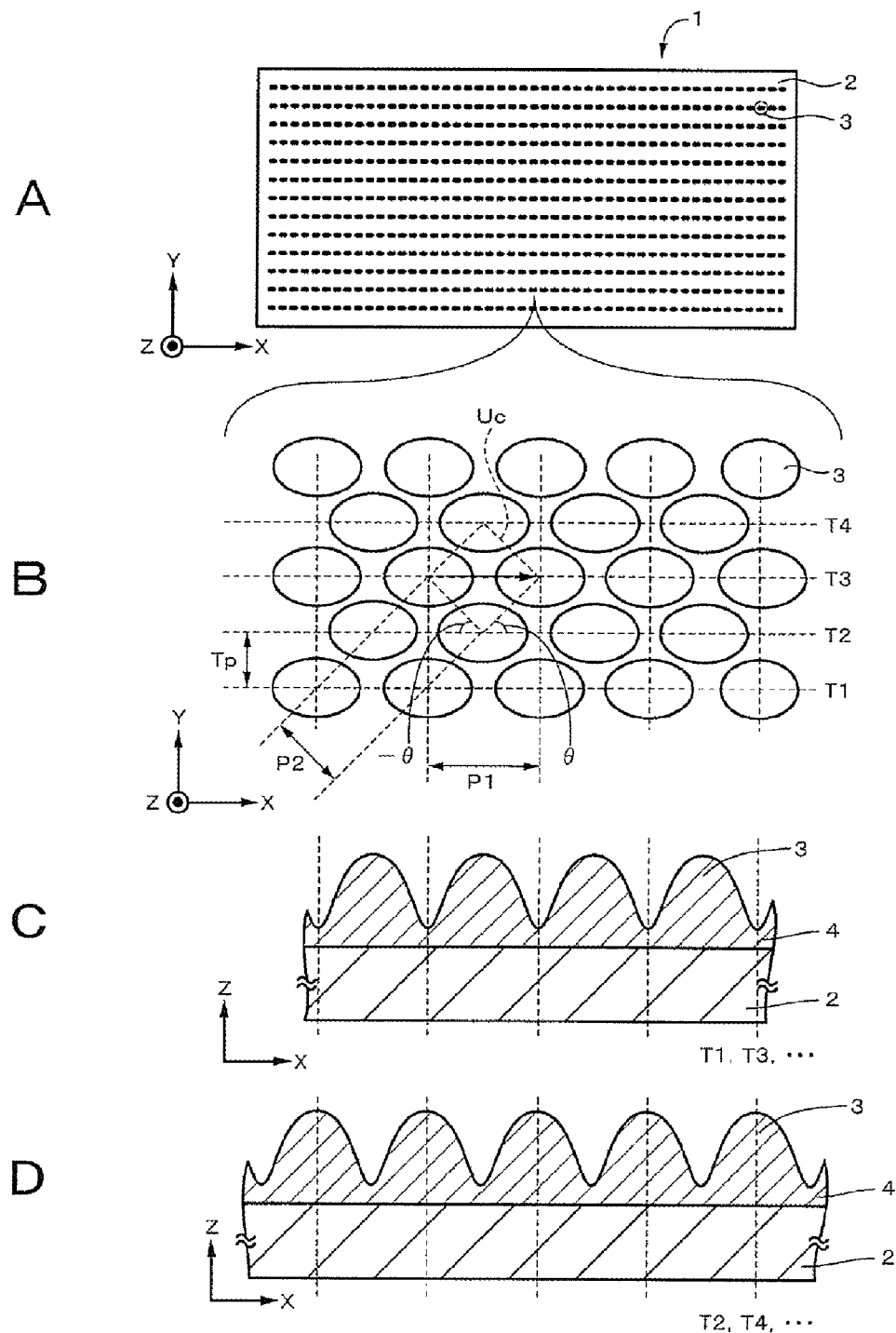
FIG. 9A is a plan view illustrating an example of the structure of an optical element according to a second embodiment of this technique.
FIG. 9B is a plan view illustrating an enlarged part of the optical element shown in FIG. 9A.
FIG. 9C is a cross-sectional view along tracks T1, T3, . . .
FIG. 9D is a cross-sectional view along tracks T2, T4, . . .

FIG. 9A is a plan view illustrating an example of the structure of an optical element according to a second embodiment of this technique. FIG. 9B is a plan view illustrating an enlarged part of the optical element shown in FIG. 9A. FIG. 9C is a cross-sectional view along tracks T1, T3, . . . in FIG. 9B. FIG. 9D is a cross-sectional view along tracks T2, T4, . . . in FIG. 9B.

The optical element 1 according to the second embodiment differs from that according to the first embodiment in that multiple structures 3 make a square grind pattern or a quasi-square grind pattern among adjacent three rows of tracks T.

The square grid herein refers to a regular tetragonal grid. The quasi-square grid refers to a strained regular tetragonal grid, unlike the regular tetragonal grid. For example, when the structures 3 are arranged on a line, the quasi-square grid refers to a square grid strained by drawing a regular tetragonal grid in the linear arrangement direction (track direction). When the structures 3 are arranged in a meandering fashion, the quasi-square grid refers to a square grid obtained by straining a regular tetragonal grid with the meandering arrangement of the structures 3. Alternatively, the quasi-square grid refers to a square grid strained by drawing a regular tetragonal grid in the linear arrangement direction (track direction), and straining the grid with the meandering arrangement of the structures 3.

The arrangement pitch P1 of the structures 3 in the same track is preferably longer than the arrangement pitch P2 of the structures 3 between two adjacent tracks. In addition, the P1/P2 preferably satisfies the relationship of $1.4 < P1/P2 \leq 1.5$ where the arrangement pitch of the structures 3 in the same track and the arrangement pitch of the structures 3 between two adjacent tracks are respectively denoted by P1 and P2.

This numerical range can improve the packing ratio of the structures 3 which have the shape of an elliptic cone or an elliptic conical trapezoid, and thus improve the antireflection characteristics. In addition, the height or depth of the structure 3 in a direction at 45 degrees or in a direction at approximately 45 degrees with respect to the track is preferably smaller than height or depth of the structure 3 in the extending direction of the track.

The height H2 in the arrangement direction (θ direction) of the structures 3, which is oblique to the extending direction of the track, is preferably smaller than the height H1 of the structures 3 in the extending direction of the track. More specifically, the heights H1 and H2 of the structures 3 preferably satisfy the relationship of H1>H2.

When the structures 3 form a square grid or quasi-square grid pattern, the ellipticity e of the structure bottom is preferably 150%≤e≤180%. This range can improve the packing rate of the structures 3, and achieve excellent antireflection characteristics.

The packing ratio of the structures 3 on the substrate surface falls, with 100% as an upper limit, within the range of 65% or more, preferably 73% or more, and more preferably 86% or more. The packing ratio in this range can improve the antireflection characteristics.

In this case, the packing ratio (average packing ratio) of the structures 3 is a value obtained in the following way.

First, the surface of the optical element 1 is photographed in Top View with the use of a scanning electron microscope (SEM: Scanning Electron Microscope). Next, unit grids Uc are drawn at random from the taken SEM photograph, and the arrangement pitch P1 and track pitch Tp are measured for the unit grids Uc (see FIG. 9B). In addition, the bottom area S of any of the four structures 3 included in the unit grid Uc is measured by image processing. Next, the packing ratio is figured out from the following formula (4) with the use of the measured arrangement pitch P1, track pitch Tp, and bottom area S.

$$\text{Packing Ratio} = (S(\text{tetra})/S(\text{unit})) \times 100 \quad (4)$$

Unit Grid Area: $S(\text{unit}) = 2 \times ((P1 \times Tp) \times (1/2)) = P1 \times Tp$
Bottom Area of Structure in Unit Grid: $S(\text{tetra}) = S$ The unit grids at 10 points drawn at random from the taken SEM photograph are subjected to the above-described processing for calculating packing ratio. Then, the average (arithmetic mean) of the measurement values is simply figured out to the average ratio for the packing ratio, and this average ratio is regarded as the packing ratio of the structures 3 on the substrate surface.

The ratio $((2r/P1) \times 100)$ of a radial length $2r$ to the arrangement pitch P1 is 64% or more, preferably 69% or more, and more preferably 73% or more. This is because this range can improve the packing ratio of the structures 3 and improve the antireflection characteristics. In this case, the arrangement pitch P1 refers to the arrangement pitch of the structures 3 in the track direction, whereas the radial length $2r$ refers to the radial length of the structure bottom in the track direction. It is to be noted that the radial length $2r$ serves as a diameter when the structure bottom is circular, whereas the radial length $2r$ serves as a longer diameter when the structure bottom is elliptical.

According to the second embodiment, the same effect can be achieved as in the first embodiment.

<Third Embodiment>

FIG. 10A is a plan view illustrating an example of the structure of an optical element according to a third embodiment of this technique. FIG. 10B is a plan view illustrating an enlarged part of the optical element shown in FIG. 10A. FIG. 10C is a cross-sectional view along the line A-A shown in FIG. 10B.

The optical element 1 according to the third embodiment differs from the first embodiment in that multiple structures 3 are two-dimensionally arranged in a random (irregular) manner. In addition, the structures 21 may be further varied in a random manner in terms of at least one of shape, size, and height.

The same applies to this third embodiment as the first embodiment, except for the foregoing For the master for preparing this optical element 1, for example, a method can be used in which the surface of an aluminum substrate is subjected to anodization, but the embodiment is not to be considered limited to this method.

The unevenness generated in appearance can be suppressed, because the multiple structures 3 are two-dimensionally arranged in a random manner in the third embodiment.

<4. Fourth Embodiment>

Figure 11:
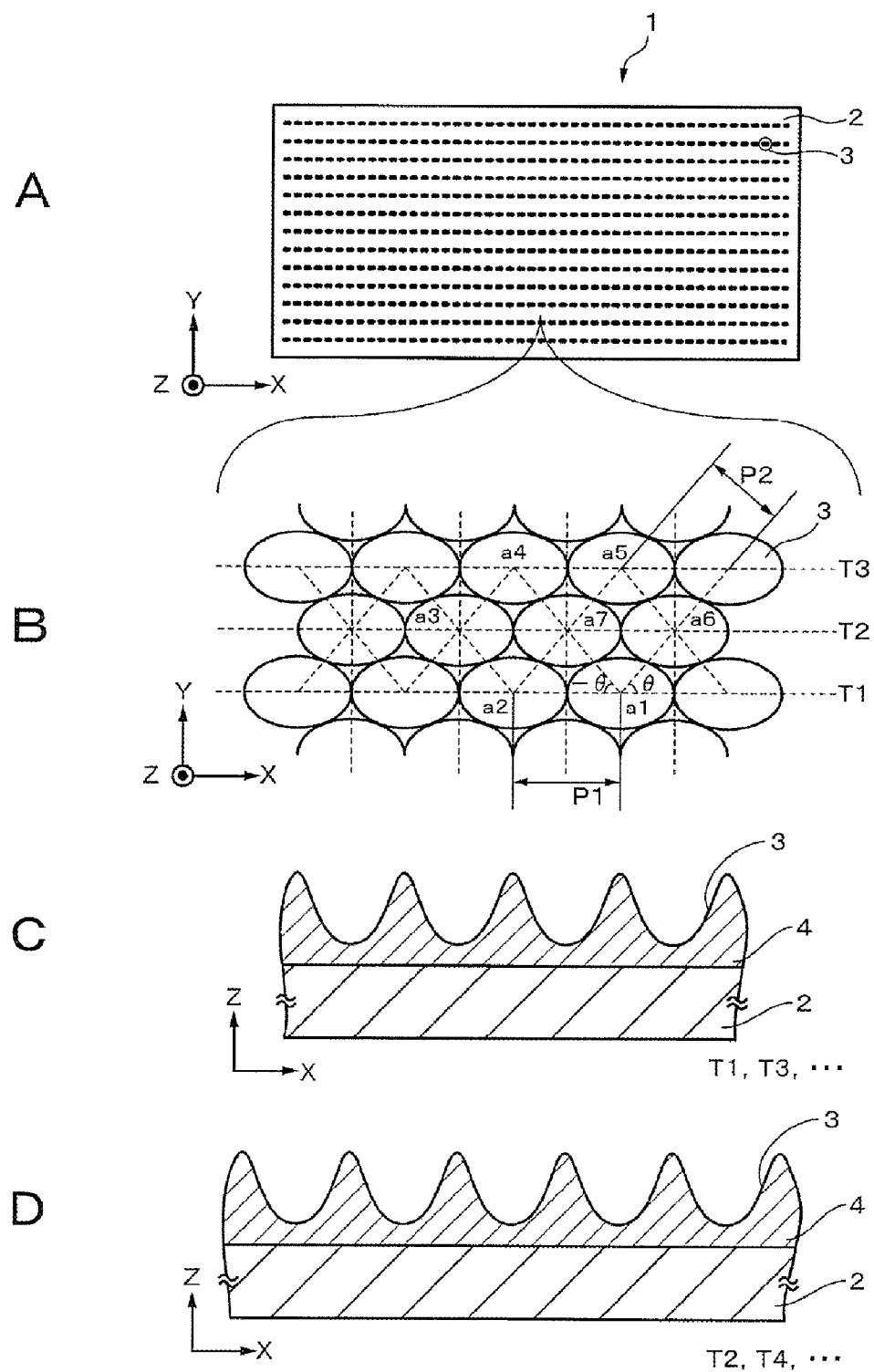
FIG. 11A is a plan view illustrating an example of the structure of an optical element according to a fourth embodiment of this technique.
FIG. 11B is a plan view illustrating an enlarged part of the optical element shown in FIG. 11A.
FIG. 11C is a cross-sectional view along tracks T1, T3, . . .
FIG. 11D is a cross-sectional view along tracks T2, T4, . . .

FIG. 11A is a plan view illustrating an example of the structure of an optical element according to a fourth embodiment of this technique. FIG. 11B is a plan view illustrating an enlarged part of the optical element shown in FIG. 11A. FIG. 11C is a cross-sectional view along tracks T1, T3, ... in FIG. 11B. FIG. 11D is a cross-sectional view along tracks T2, T4, ... in FIG. 11B.

The optical element 1 according to the fourth embodiment differs from that according to the first embodiment in that a large number of concave structures 3 are arranged at a substrate surface. The shape of the structure 3 is a concave shape obtained by inversing the convex shape of the structure 3 according to the first embodiment. It is to be noted that when the structure 3 have a concave shape as described above, the opening (concave inlet of the concave portion) of the concave structure 3 is defined as a bottom, whereas the lowest part (the deepest part of the concave portion) of the substrate 2 in the depth direction is defined as a top. More specifically, the top and the bottom are defined by the structure 3 as a non-substantive space. In addition, in the fourth embodiment, the height of the structure 3 in the formula (1), etc. corresponds to the depth H of the structure 3, because the structure 3 is concave.

The same applies to this fourth embodiment as the first embodiment, except for the foregoing In this fourth embodiment, an effect similar to that in the first embodiment can be achieved because the shape of the convex structure 3 in the first embodiment is reversed to provide the concave shape.

<5. Fifth Embodiment>

The optical element according to the thirteenth embodiment differs from the first embodiment in that the numerical range of the crosslink density of a resin material contained in the structures 3 is specified, in addition to the numerical range of the elastic modulus of the resin material forming the structures 3, or in place of the numerical range of the elastic modulus of the resin material forming the structures 3.

The crosslink density of the resin material contained in the structures 3 falls within the range of 5.1 mol/L or less, preferably 0.8 mol/L or more and 5.1 mol/L or less. The crosslink density of 5.1 mol/L or less can make the inter-crosslink distance longer, and provide the resin material with flexibility. Therefore, it becomes possible to discharge and wipe off contamination such as fingerprints. It is to be noted that the inter-crosslink distance is made longer when the crosslink density is decreased (that is, the reciprocal of the crosslink density is increased), because the reciprocal of the crosslink density corresponds to the inter-crosslink molecular weight.

On the other hand, the crosslink density less than 0.8 mol/L dramatically degrades the abrasion resistance of coating film, and there is thus concern about scratch due to the wiping. While the crosslinks include chemical crosslinks and physical crosslinks, it is preferable to use chemical crosslinks.

In addition, the surface of the optical element 1 is preferably made further hydrophilic. This is because the hydrophilicity makes it possible to wipe off contamination due to the discharge effect and replacement with moisture through rubbing with a water-containing cloth, for example, once or twice. The water contact angle at the hydrophilic surface of the optical element 1 is preferably 110 degrees or less, more preferably 30 degrees or less.

Figure 17:
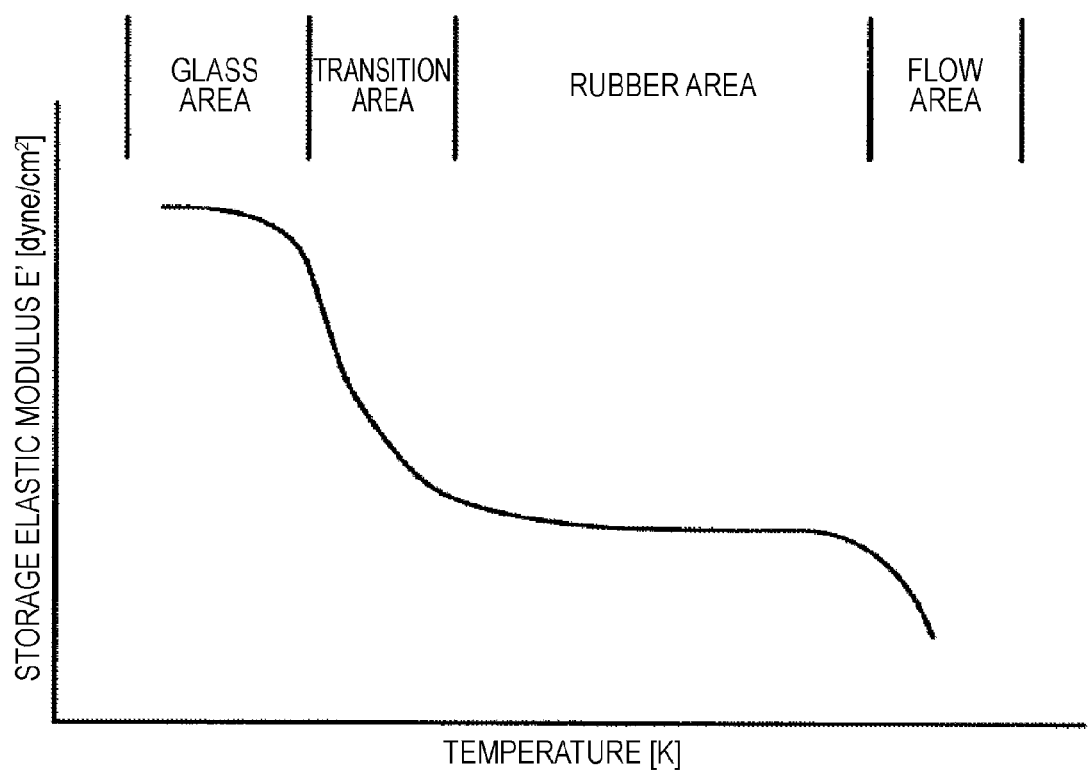
FIG. 17 is a correlation diagram between storage elastic modulus and temperature for a common ultraviolet curable resin.
Figure 18:
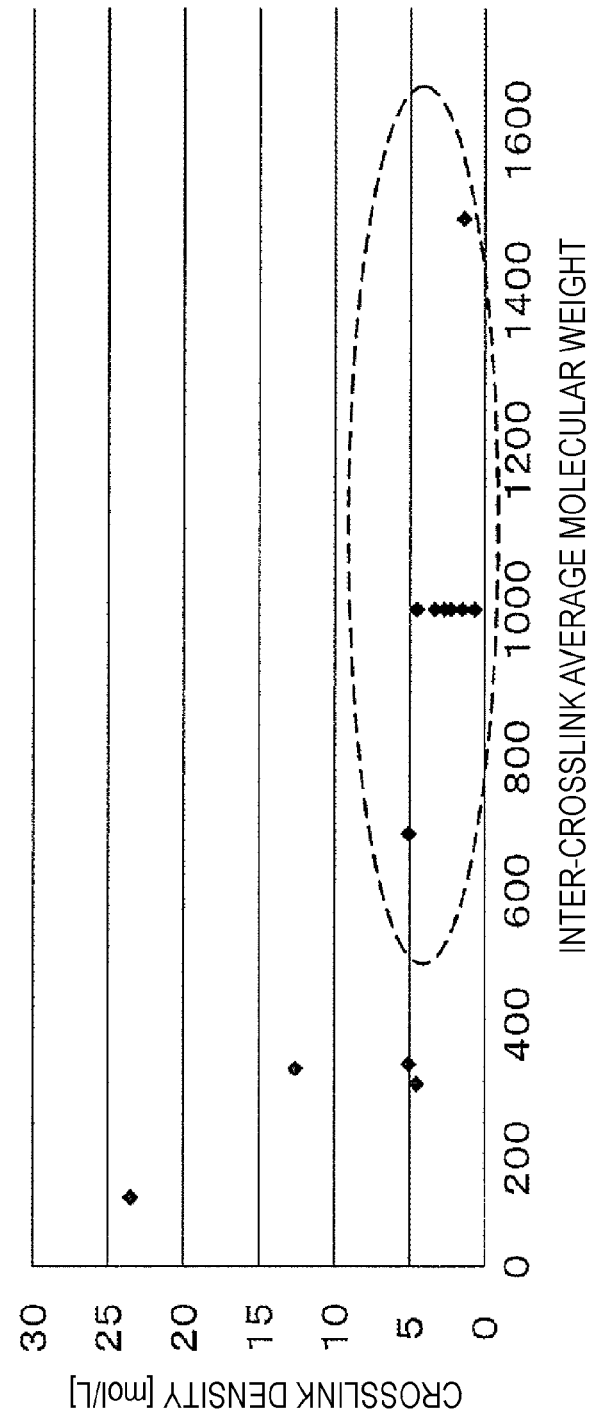
FIG. 18 is a graph plotting the crosslink density and inter-crosslink average molecular weight for samples 1 to 12 in an example.

Now, a method for calculating the crosslink density of the structures 3 will be described with reference to FIG. 17. The crosslink density of the resin material has a temperature dependence as shown in FIG. 17. The crosslink density of the resin material is correlated with the condition of the resin material, and the crosslink density is divided into four areas of: a glass area; a transition area; a rubber area; and a flow area, depending on the temperature ranges. Among the areas, the crosslink density in the rubber area is expressed by the following formula.

$$n = E'/3RT$$

(in the formula, n represents the crosslink density (mol/L), E' represents a storage elastic modulus (Pa), R represents a gas constant (Pa·L/K·mol), and T represents an absolute temperature (K).)

Therefore, the use of the formula mentioned above can calculate the crosslink density n from the storage elastic modulus E' and the absolute temperature.

When the crosslink density of the resin material contained in the structures 3 falls within the numerical range mentioned above, the inter-crosslink average molecular weight of the resin material contained in the structures 3 preferably falls within the range between 400 and 60000, more preferably between 500 and 10000, further preferably between 700 and 1500. The crosslink density of 5.1 mol/L or less and the inter-crosslink average molecular weight of 400 or more can further improve the wiping ability, as compared with a case of limiting only the numerical range of the crosslink density to 5.1 mol/L or less. On the other hand, the crosslink density of 0.8 mol/L or more and the inter-crosslink average molecular weight of 60000 or less can improve the wiping ability, and suppress scratching on coating film. In this case, the inter-crosslink average molecular weight of the resin material contained in the structures 3 refers to a value obtained by dividing the average molecular weight of a resin raw material (for example, such as an oligomer) involved in the polymerization reaction by the average number of functional groups, when the resin raw material involved in the polymerization reaction is trifunctional or more. When the resin raw material involved in the polymerization reaction is bifunctional, the average molecular weight of the resin raw material is regarded as the inter-crosslink average molecular weight. However, the resin raw material involved in the polymerization reaction is considered to encompass no monofunctional resin raw materials.

The structures 3 preferably contain a straight-chain polymer as their main constituent. This is because the wiping ability can be improved. The straight-chain polymer is, for example, a chain polymer that has a compound having two (meth)acryloyl groups in a chained form in a one-dimensional fashion. The compound is preferably an oligomer having two (meth)acryloyl groups. The (meth)acryloyl group herein refers to any of an acryloyl group and a methacryloyl group.

The structures 3 are obtained by, for example, curing the ultraviolet curable resin. The resin component contained in the ultraviolet curable resin preferably contains, as its main constituent, at least one of an oligomer having two (meth)acryloyl groups and an oligomer having three (meth)acryloyl groups, and more preferably contains, as its main constituent, an oligomer having two (meth)acryloyl groups. When the component contains, as its main constituent, at least one of the oligomer having two (meth)acryloyl groups and the oligomer having three (meth)acryloyl groups, the inter-crosslink average molecular weight can be adjusted to 400 or more. The component containing, as its main constituent, the oligomer having two (meth)acryloyl groups can achieve the inter-crosslink average molecular weight of 400 or more, and suppress the increase in the viscosity of the ultraviolet curable resin as a transfer material to improve the transferability of the ultraviolet curable resin as a transfer material. The oligomer herein refers to a molecular that has a molecular weight of 400 or more and 60000 or less.

In order to adjust the elastic modulus of the structures 3, the ultraviolet curable resin may further contain a compound (for example, a monomer and/or an oligomer) having a (meth)acryloyl group and/or a resin material (for example, a monomer and/or an oligomer) that is not involved in the polymerization reaction.

EXAMPLES

While this technique will be specifically described below with reference to examples, this technique is not to be considered limited to only these examples.

In the following examples and comparative examples, ultraviolet curable resin compositions A to F refer to the following blended compositions.
(Ultraviolet Curable Resin Composition A)
Light Curable Resin 97 mass %
Photopolymerization Initiator 3 mass %
(Ultraviolet Curable Resin Composition B)
Urethane Acrylate Blend 92 mass %
Photopolymerization Initiator 3 mass %
Hydrophilic Coating Material 5 mass %
(Ultraviolet Curable Resin Composition C)
Light Curable Resin
First Photopolymerization Initiator
Second Photopolymerization Initiator
(Ultraviolet Curable Resin Composition D)
Urethane Acrylate Blend
First Photopolymerization Initiator
Second Photopolymerization Initiator
Hydrophilic Coating Material 5 mass %
(Ultraviolet Curable Resin Composition E)
Light Curable Resin 97 mass %
Photopolymerization Initiator 3 mass %
(Ultraviolet Curable Resin Composition F)
Urethane Acrylate Blend 92 mass %
Photopolymerization Initiator 3 mass %
Hydrophilic Coating Material 5 mass %

The examples, comparative examples, and test examples will be described in the following consideration order.
1. Luminance and Contrast (Example 1, Comparative Example 1)
2. Color Space (Example 2, Comparative Example 2)
3. Durability (Example 3, Comparative Example 3)
4. Surface Roughness (Examples 4 and 5, Comparative Examples 4 and 5)
5. Changes in L*a*b* Chromaticity with Photopolymerization Initiator (Test Examples 1 to 6)

6. L*a*b* Chromaticity for Films (Test Examples 7 to 15)
7. Difference in Refractive Index (Test Examples 16-1 to 20-3)
8. Expansion Coefficient (Test Examples 21 to 23)
9. Wiping Ability (Test Examples 24 to 35)

<1. Luminance and Contrast>

Example 1

First, a glass roll master of 126 mm in outside diameter was prepared, and a resist film was deposited on the surface of the glass master in the following way. More specifically, a photoresist is diluted with a thinner to 1/10, and this diluted resist was applied on the order of 130 nm in thickness by dipping onto the cylindrical surface of the glass roll master to deposit a resist film. Next, the glass master as a recording medium was transported to the roll master exposure apparatus shown in FIG. 6, and the resist was exposed to obtain a latent image patterned in the resist, which lay in a spiral form and made a quasi-hexagonal grid pattern among three adjacent tracks.

Specifically, the region with a quasi-hexagonal grid pattern to be formed was irradiated with laser light at power of 0.50 mW/m for exposing up to the surface of the glass roll master to form a concave quasi-hexagonal grid pattern. It is to be noted that the resist thickness was on the order of 120 nm in the row direction of the track row, whereas the resist thickness was on the order of 100 nm in the extending direction of the track.

Next, the resist on the glass roll master was subjected to a treatment for development to dissolve the resist in the exposed region for development. Specifically, the undeveloped glass roll master was placed on a turn table of a developing machine, not shown, and while rotating the whole of the turn table, a developer was delivered by drops onto the surface of the glass roll master to develop the resist at the surface. Thus, a resist glass master was obtained with the resist opened in a quasi-hexagonal grid pattern.

Next, etching processing and ashing processing were alternately carried out by dry etching to obtain a concave in an elliptic cone shape with a convex curved surface at the top. The etching amount (depth) in the pattern in this case was varied depending on the etching time. Finally, the photoresist was removed completely by $O_2$ ashing to obtain a MOTH-EYE glass roll master in the concave quasi-hexagonal grid pattern. The depth of the concave in the row direction was larger than the depth of the concave in the extending direction of the track.

Next, the ultraviolet curable resin composition B was prepared. Next, an acrylic film with a thickness of 75 μm (from Sumitomo Chemical Co., Ltd., Trade Name: TEKUNOROI S001) was prepared as a substrate. Next, the ultraviolet curable resin composition B was applied for several μm in thickness onto the acrylic film, and the MOTH-EYE glass roll master was then closely attached to the application surface, and detached while curing the composition B by ultraviolet irradiation, thereby preparing a MOTH-EYE film. In this case, a base layer was formed between the structures and the acrylic film by regulating the pressure of the MOTH-EYE glass roll master on the application surface.

Next, the surface of the prepared MOTH-EYE film was observed under an atomic force microscope (AFM: Atomic Force Microscope). Next, the pitch and aspect ratio of the structures were figured out from the cross-section profile under the AFM. As a result, the pitch was 250 nm and the aspect ratio was 1.0.

Next, printing paper was prepared, and subjected to printing to form a white area and a black area.

Next, the prepared MOTH-EYE film was attached to the printed image surface of the printing paper with an adhesive sheet (from Sony Chemical & Information Device Corporation). Thus, the intended printed paper according to Example 1 was obtained.

Comparative Example 1

Next, printing paper was prepared, and used itself as printing paper according to Comparative Example 1.

(Reflectivity)
Reflection spectra for the printed paper surfaces according to Example 1 and Comparative Example 1 were measured with the use of a visible-ultraviolet spectrophotometer (from JASCO Corporation, Trade Name: V-500). FIG. 12A shows the reflectivity at a wavelength of 550 nm.

(Luminance)
The printed papers according to Example 1 and Comparative Example 1 were evaluated for white luminance and black luminance. The results are shown in Table 1.

(Contrast)
The printed papers according to Example 1 and Comparative Example 1 were evaluated for contrast. The results are shown in Table 1.

Table 1 shows the evaluation results of the printed paper according to Example 1 and Comparative Example 1 for luminance and contrast.

TABLE 1

|  | Structure | White Luminance | Black Luminance | Contrast |
|---|---|---|---|---|
| Example 1 | Printed Paper, MOTH-EYE Film | 79.94 | 0.95 | 84.34 |
| Comparative Example 1 | Printed Paper | 81.06 | 5.39 | 15.04 |

The following is determined from FIG. 12A.

Example 1 with the MOTH-EYE film attached can substantially reduce the reflectivity, as compared with Comparative Example 1 with no MOTH-EYE film attached. Therefore, the attachment of the MOTH-EYE film to photographic paper can substantially improve the visibility of the photographic paper.

The following is determined from Table 1.

When the evaluation results are compared between Example 1 with the MOTH-EYE film attached and Comparative Example 1 without the MOTH-EYE film attached, the both have almost the same white luminance, whereas the black luminance differs substantially therebetween. As a result, the ratio of the contrast in Example 1 to the contrast in Comparative Example 1 (contrast ratio) is approximately 5.6. More specifically, the printed image has improved visibility in Example 1 as compared with comparative Example 1.

<2. Color Space>

Example 2

First, printing paper was prepared, and RGB (red, green, and blue) were printed on this printing paper. Next, a MOTH- EYE film prepared in the same way as in Example 1 was attached to the surface of the printed paper subjected to the printing, with an adhesive sheet (from Sony Chemical & Information Device Corporation). Thus, the intended printed paper according to Example 2 was obtained.

Comparative Example 2

Next, printing paper was prepared, and used itself as printing paper according to Comparative Example 2.
(Evaluation of Color Space)
The printed papers according to Example 2 and Comparative Example 2 were evaluated for L*a*b* color space. The results are shown in FIG. 12B.
The following is determined from FIG. 12B.
In Example 2 with the MOTH-EYE film attached, the color coordinate area is larger as compared with Comparative Example 1 with no MOTH-EYE film attached. Therefore, the attachment of the MOTH-EYE film to photographic paper can enlarge the color space of the photographic paper.
<3. Durability>

Example 3

First, a MOTH-EYE film was prepared in the same way as in Example 1 described above. Next, a crystal print photograph was prepared, and the MOTH-EYE film was attached to the surface of the photograph with an adhesive sheet (from Sony Chemical & Information Device Corporation). Thus, the intended photograph according to Example 3 was obtained.

Comparative Example 3

A crystal print photograph was prepared, and used itself as a photograph according to Comparative Example 3.
(Dry Wiping)
The printed papers according to Example 3 and Comparative Example 3 were subjected to a dry wiping test. The results are shown in Table 2.
(Water Wiping)
The printed papers according to Example 3 and Comparative Example 3 were subjected to a water wiping test. The results are shown in Table 2.
(Pencil Hardness)
The printed papers according to Example 3 and Comparative Example 3 were subjected to a pencil hardness measurement. The results are shown in Table 2.
Table 2 shows the results of the dry wiping test and water wiping test, as well as the results of the pencil hardness measurement, for the printed papers according to Example 3 and Comparative Example 3.

TABLE 2

| | Structure | Dry Wiping | Water Wiping | Pencil Hardness |
|---|---|---|---|---|
| Example 2 | Crystal Print Photograph, MOTH-EYE Film | ⊙ | ⊙ | 2H |
| Comparative Example 2 | Crystal Print Photograph | X Scratch | X Dissolution | <6B |

The following is determined from Table 2.
In Example 3 with the MOTH-EYE film attached, the durability of the surface is improved as compared with Comparative Example 3 with no MOTH-EYE film attached.
<4. Surface Roughness>

Example 4

First, a MOTH-EYE film was prepared in the same way as in Example 1 described above. Next, a photograph on a common paper substrate was prepared, and the MOTH-EYE film was attached to the surface of the photograph with an adhesive sheet (from Sony Chemical & Information Device Corporation). Thus, the intended photograph according to Example 4 was obtained.

Example 5

First, a MOTH-EYE film was prepared in the same way as in Example 1 described above. Next, a crystal print photograph was prepared, and the MOTH-EYE film was attached to the surface of the photograph with an adhesive sheet (from Sony Chemical & Information Device Corporation). Thus, the intended photograph according to Example 5 was obtained.

Comparative Example 4

A photograph on a common paper substrate was prepared, and used itself as a photograph according to Comparative Example 4.

Comparative Example 5

A crystal print photograph was prepared, and used itself as a photograph according to Comparative Example 5.
(Surface Roughness)
For the photographs according to Examples 4 and 5 and Comparative Examples 4 and 5, the surface roughness was measured with the use of a geometry measurement machine (SURFCORDER) (from Kosaka Laboratory Ltd., Trade Name: ET 4000). The results are shown in Table 3.
(Visual Inspection)
The surfaces of the photographs according to Examples 4 and 5 and Comparative Examples 4 and 5 were visually observed, and evaluated. The results are shown in Table 9. It is to be noted that the evaluation was made by three observers on the basis of the following criteria.
⊙: no photograph surface asperity concerned at all
○: no photograph surface asperity found unless a careful observation was made.
x: photograph surface asperity relatively easily found.
It is to be noted that from the photographs with the evaluation result of "○" or "⊙", a beautiful impression was able to be given without concern for asperity.
Table 3 shows the results of measuring the surface roughness for the photographs according to Examples 4 and 5 and Comparative Examples 4 and 5.

TABLE 3

| | Comparative Example 4 | Example 4 | Comparative Example 5 | Example 5 |
|---|---|---|---|---|
| Structure | Common Paper Photograph | Common Paper Photograph, MOTH-EYE Film | Crystal Print Photograph | Crystal Print Photograph, MOTH-EYE Film |

TABLE 3-continued

|  | Comparative Example 4 | Example 4 | Comparative Example 5 | Example 5 |
|---|---|---|---|---|
| Center Line Average Roughness Ra [μm] | 0.142 | 0.027 | 0.044 | 0.002 |
| Maximum Height Rmax [μm] | 3.885 | 1.949 | 4.774 | 1.004 |
| Ten-Point Average Roughness Rz [μm] | 1.710 | 0.468 | 1.409 | 0.245 |
| Visibility | X | ⊙ | ○ | ⊙ |

The following is determined from Table 3.

The attachment of the MOTH-EYE film to the photograph on the common paper substrate can achieve a beautiful surface as compared with the surface of the photograph on the common paper substrate. In addition, the attachment of the MOTH-EYE film to the crystal print photograph can achieve a beautiful surface as compared with the surface of the crystal print photograph.

<5. Changes in L*a*b* Chromaticity with Photopolymerization Initiator>

Test Example 1

Except for the use of the ultraviolet curable resin composition A, a MOTH-EYE film was obtained in the same way as in Example 1.

Test Example 2

Except for the use of the ultraviolet curable resin composition B, a MOTH-EYE film was obtained in the same way as in Test Example 1.

Test Example 3

Except for the use of the ultraviolet curable resin composition C, a MOTH-EYE film was obtained in the same way as in Test Example 1.

Test Example 4

Except for the use of the ultraviolet curable resin composition D, a MOTH-EYE film was obtained in the same way as in Test Example 1.

Test Example 5

Except for the use of the ultraviolet curable resin composition E, a MOTH-EYE film was obtained in the same way as in Test Example 1.

Test Example 6

Except for the use of the ultraviolet curable resin composition F, a MOTH-EYE film was obtained in the same way as in Test Example 1.

(Transmission Hue)

With the MOTH-EYE films according to Test Examples 1 to 6 as measurement samples, transmission spectra in a wavelength range (350 nm to 800 nm) around visible light were measured with the use of a visible-ultraviolet spectrophotometer (from JASCO Corporation, Trade Name: V-500) to represent the coloring in the L*a*b* system. The results are shown in Table 4.

(Coloring)

The MOTH-EYE films according to Test Examples 1 to 6 were visually observed to evaluate the coloring. The results are shown in Table 4. It is to be noted that the evaluation was made by three observers on the basis of the following criteria.

⊙: no coloring concerned at all
○: no coloring found unless a careful observation was made.
x: coloring relatively easily found.

Table 4 shows the results of evaluating the MOTH-EYE films according to Test Examples 1 to 6 for transmission hue and coloring.

TABLE 4

|  | Test Example 1 | Test Example 2 | Test Example 3 | Test Example 4 | Test Example 5 | Test Example 6 |
|---|---|---|---|---|---|---|
| Resin | A | B | C | D | E | F |
| Photopolymerization Initiator | Irgacure 184 | Irgacure 184 | Irgacure 184, Irgacure 812 | Irgacure 184, Irgacure 812 | OXE-01 | OXE-01 |
| Y | 94.04 | 93.30803522 | 93.74 | 94.32 | 94.33 | 94.45 |
| x | 0.31 | 0.31365988 | 0.32 | 0.32 | 0.31 | 0.31 |
| y | 0.33 | 0.491963258 | 0.33 | 0.5 | 0.13 | 0.07 |
| L* | 97.64701059 | 97.35247419 | 97.52514168 | 97.76158515 | 97.7638125 | 97.81136584 |
| a* | −0.13 | −0.11 | −0.56 | −0.73 | −0.6 | −0.47 |
| b* | 0.48 | 0.62 | 2 | 1.95 | 1.67 | 1.38 |
| Coloring | ⊙ | ⊙ | x | x | ○ | ○ |

The following is determined from Table 4.

When the transmission hue in the L*a*b* system at the surface opposite to the surface with the MOTH-EYE structure formed satisfies the relationship of: $L^* \geq 96$; $|b^*| \leq 1.9$; and $|a^*| \leq 0.7$, coloring of the MOTH-EYE film can be suppressed.

<6. L*a*b* Chromaticity for Films>

Test Example 7

An urethane film of 100 μm in thickness was prepared, and used as an optical film according to Test Example 7.

Test Example 8

An urethane film of 200 μm in thickness was prepared, and used as an optical film according to Test Example 8.

Test Example 9

An urethane film of 300 μm in thickness was prepared, and used as an optical film according to Test Example 9.

Test Example 10

An urethane film of 400 μm in thickness was prepared, and used as an optical film according to Test Example 10.

Test Example 11

An urethane film of 100 μm in thickness was prepared, and used as an optical film according to Test Example 11.

Test Example 12

An urethane film of 100 μm in thickness was prepared, and used as an optical film according to Test Example 12.

Test Example 13

An urethane film of 200 μm in thickness was prepared, and used as an optical film according to Test Example 13.

Test Example 14

An urethane film of 150 μm in thickness was prepared, and used as an optical film according to Test Example 14.

Test Example 15

An urethane film of 75 μm in thickness was prepared, and used as an optical film according to Test Example 15.

(Transmission Hue)

With the optical films according to Test Examples 7 to 15 as measurement samples, transmission spectra in a wavelength range (350 nm to 800 nm) around visible light were measured with the use of a visible-ultraviolet spectrophotometer (from JASCO Corporation, Trade Name: V-500) to represent the coloring in the $L^*a^*b^*$ system. The results are shown in Table 5.

(Coloring)

The optical films according to Test Examples 7 to 15 were visually observed to evaluate the coloring. The results are shown in Table 5. It is to be noted that the evaluation was made by three observers on the basis of the following criteria.

⊙: no coloring concerned at all
○: no coloring found unless a careful observation was made.
x: coloring relatively easily found.

Table 5 shows the results of evaluating the optical films according to Test Examples 7 to 15 for transmission hue and coloring.

TABLE 5

|  | Test Example 7 | Test Example 8 | Test Example 9 | Test Example 10 | Test Example 11 | Test Example 12 | Test Example 13 | Test Example 14 | Test Example 15 |
| --- | --- | --- | --- | --- | --- | --- | --- | --- | --- |
| Film Type | Higress from Sheedom Co., Ltd. | Higress from Sheedom Co., Ltd. | Higress from Sheedom Co., Ltd. | Higress from Sheedom Co., Ltd. | Higress from Sheedom Co., Ltd. | Higress from Sheedom Co., Ltd. | Higress from Sheedom Co., Ltd. | Higress from Sheedom Co., Ltd. | TEKUNOROI S001 from Sumitomo Chemical Co., Ltd. |
| Film Thickness [μm] | 100 | 200 | 300 | 400 | 100 | 100 | 200 | 150 | 75 |
| Y | 90.65166 | 91.16603 | 90.13470 | 90.62133 | 90.60544 | 90.19463 | 90.16419 | 89.61238 | 91.00 |
| x | 0.31336 | 0.31333 | 0.31369 | 0.31380 | 0.31323 | 0.31364 | 0.31375 | 0.31359 | 0.31 |
| y | 0.32968 | 0.32968 | 0.48882 | 0.19789 | 0.12372 | 0.08958 | 0.07044 | 0.05772 | 0.33 |
| L* | 96.26643 | 96.47837 | 96.05261 | 96.25391 | 96.24735 | 96.07744 | 96.06483 | 95.83575 | 96.41 |
| a* | 0.01248 | −0.00186 | 0.01120 | −0.03902 | −0.00506 | −0.01211 | −0.06600 | −0.01077 | 0.04 |
| b* | 0.35039 | 0.34132 | 0.54085 | 0.63852 | 0.28596 | 0.52775 | 0.63024 | 0.49522 | 0.45 |
| Coloring | ⊙ | ⊙ | ○ | x | ⊙ | ○ | x | ⊙ | ⊙ |

The following is determined from Table 5.

When the transmission hue in the L*a*b* system satisfies the relationships of: $L^* \geq 95$; $|b^*| \leq 0.53$; and $|a^*| \leq 0.05$, coloring of the optical films can be suppressed.

<7. Difference in Refractive Index>

Test Example 16-1

In the following way, the luminous reflectance R was figured out for a laminated body composed of a MOTH-EYE structure (refractive index n=1.3), a substrate (refractive index n=1.3 to 1.7), and an adhesive layer (refractive index n=1.3 to 1.7).

Figure 13:
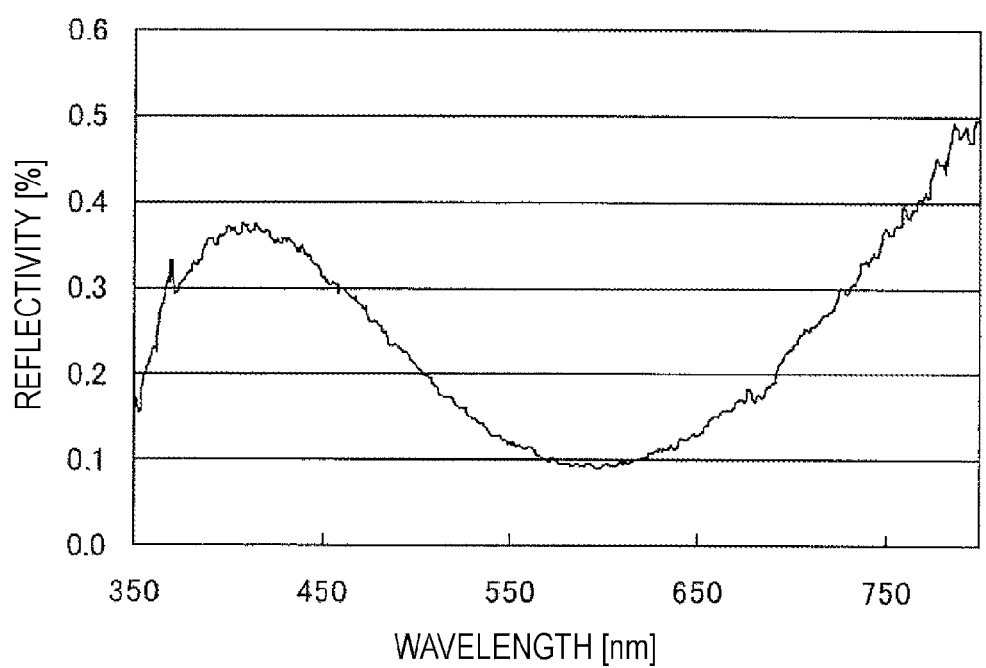
FIG. 13 is a graph showing a reflection spectrum for the surface of a MOTH-EYE structure according to test example 16-1.

First of all, the luminous reflectance R1 of the MOTH-EYE structure surface was figured out in the following way. First, a MOTH-EYE film was prepared in the same way as in Example 1. Next, a treatment for cutting the reflection from the back surface of the MOTH-EYE film was carried out by attaching a black tape to the back surface (the surface opposite to the surface with the MOTH-EYE structure formed) of the MOTH-EYE film as a sample. Next, a reflection spectrum was measured with the use of a visible-ultraviolet spectrophotometer (from JASCO Corporation, Trade Name: V-500). The result is shown in FIG. 13. In the measurement, a regular reflection 5° unit was used. Next, the luminous reflectance R1 was figured out in accordance with JIS Z8701-1982 from the measured reflection spectrum.

Next, the luminous reflectance R2 at the interface between the MOTH-EYE structure and the substrate was figured out by an optical simulation.

Next, the luminous reflectance R3 at the interface between the structure and the adhesive layer was figured out by an optical simulation in the following way.

The luminous reflectances R1, R2, and R3 figured out in the way described above were simply summed to obtain the luminous reflectance R(R1+R2+R3) for the laminated body.

Test Example 16-2

Next, the luminous reflectance R was figured out for a laminated body composed of an antireflection (AR: Anti-Reflection) layer (refractive index n=1.3) prepared by a dry process, a substrate (refractive index n=1.3 to 1.7), and an adhesive layer (refractive index n=1.3 to 1.7).

It is to be noted that the luminous reflectance R was figured out in the same way as in Test Example 16-1, except that the luminous reflectance R1 of the antireflection layer surface prepared by the dry process was used in place of the luminous reflectance R1 of the MOTH-EYE structure surface.

Test Example 16-3

Next, the luminous reflectance R was figured out for a laminated body composed of an antireflection (AR: Anti-Reflection) layer (refractive index n=1.3) prepared by a wet process, a substrate (refractive index n=1.3 to 1.7), and an adhesive layer (refractive index n=1.3 to 1.7).

It is to be noted that the luminous reflectance R was figured out in the same way as in Test Example 16-1, except that the luminous reflectance R1 of the antireflection layer surface prepared by the wet process was used in place of the luminous reflectance R1 of the MOTH-EYE structure surface.

Test Example 17-1

The luminous reflectance R for a laminated body was figured out in the same way as in Test Example 16-1, except that the refractive index n of the MOTH-EYE structure was adjusted to 1.4.

Test Example 17-2

The luminous reflectance R for a laminated body was figured out in the same way as in Test Example 16-2, except that the refractive index n of the antireflection layer prepared by the dry process was adjusted to 1.4.

Test Example 17-3

The luminous reflectance R for a laminated body was figured out in the same way as in Test Example 16-3, except that the refractive index n of the antireflection layer prepared by the wet process was adjusted to 1.4.

Test Example 18-1

The luminous reflectance R for a laminated body was figured out in the same way as in Test Example 16-1, except that the refractive index n of the MOTH-EYE structure was adjusted to 1.5.

Test Example 18-2

The luminous reflectance R for a laminated body was figured out in the same way as in Test Example 16-2, except that the refractive index n of the antireflection layer prepared by the dry process was adjusted to 1.5.

Test Example 18-3

The luminous reflectance R for a laminated body was figured out in the same way as in Test Example 16-3, except that the refractive index n of the antireflection layer prepared by the wet process was adjusted to 1.5.

Test Example 19-1

The luminous reflectance R for a laminated body was figured out in the same way as in Test Example 16-1, except that the refractive index n of the MOTH-EYE structure was adjusted to 1.6.

Test Example 19-2

The luminous reflectance R for a laminated body was figured out in the same way as in Test Example 16-2, except that the refractive index n of the antireflection layer prepared by the dry process was adjusted to 1.6.

Test Example 19-3

The luminous reflectance R for a laminated body was figured out in the same way as in Test Example 16-3, except that the refractive index n of the antireflection layer prepared by the wet process was adjusted to 1.6.

Test Example 20-1

The luminous reflectance R for a laminated body was figured out in the same way as in Test Example 16-1, except that the refractive index n of the MOTH-EYE structure was adjusted to 1.7.

Test Example 20-2

The luminous reflectance R for a laminated body was figured out in the same way as in Test Example 16-2, except that the refractive index n of the antireflection layer prepared by the dry process was adjusted to 1.7.

Test Example 20-3

The luminous reflectance R for a laminated body was figured out in the same way as in Test Example 16-3, except that the refractive index n of the antireflection layer prepared by the wet process was adjusted to 1.7.

(Evaluation of Luminous Reflectance)

The laminated bodies according to Test Example 16-1, Test Example 17-1, Test Example 18-1, Test Example 19-1, and Test Example 20-1 were respectively evaluated for luminous reflectance, on the basis of the luminous reflectances in Test Examples 16-2 and 16-3, Test Examples 17-2 and 17-3, Test Examples 18-2 and 18-3, Test Examples 19-2 and 19-3, and Test Examples 20-2 and 20-3 as shown below. The results are shown in Tables 6 to 10.

⊙: The luminous reflectance R for the laminated body including the MOTH-EYE structure (Test Example 16-1, Test Example 17-1, Test Example 18-1, Test Example 19-1, and Test Example 20-1) is lower than the luminous reflectance R for the laminated body including the antireflection layer prepared by the dry process (Test Example 16-2, Test Example 17-2, Test Example 18-2, Test Example 19-2, and Test Example 20-2).

o: The luminous reflectance R for the laminated body including the MOTH-EYE structure (Test Example 16-1, Test Example 17-1, Test Example 18-1, and Test Example 19-1) is lower than the luminous reflectance R for the laminated body including the antireflection layer prepared by the wet process (Test Example 16-3, Test Example 17-3, Test Example 18-3, Test Example 19-3, and Test Example 20-3).

Table 6 shows the results of evaluating the laminated bodies according to Test Examples 16-1 to 16-3 for luminous reflectance.

TABLE 6

|  |  | Substrate | | | | |
| --- | --- | --- | --- | --- | --- | --- |
|  |  | n = 1.3 | n = 1.4 | n = 1.5 | n = 1.6 | n = 1.7 |
| Adhesive Layer | n = 1.3 | ⊙ | o | o | x | x |
|  | n = 1.4 | o | o | o | o | x |
|  | n = 1.5 | x | o | o | o | o |
|  | n = 1.6 | x | x | o | o | o |
|  | n = 1.7 | x | x | x | x | x |

MOTH-EYE Structure n = 1.3

Table 7 shows the results of evaluating the laminated bodies according to Test Examples 17-1 to 17-3 for luminous reflectance.

TABLE 7

|  |  | Substrate | | | | |
| --- | --- | --- | --- | --- | --- | --- |
|  |  | n = 1.3 | n = 1.4 | n = 1.5 | n = 1.6 | n = 1.7 |
| Adhesive Layer | n = 1.3 | o | o | o | x | x |
|  | n = 1.4 | o | ⊙ | o | o | x |
|  | n = 1.5 | o | o | o | o | o |
|  | n = 1.6 | x | o | o | o | o |
|  | n = 1.7 | x | x | x | x | x |

TABLE 7-continued

|  |  | Substrate | | | | |
| --- | --- | --- | --- | --- | --- | --- |
|  |  | n = 1.3 | n = 1.4 | n = 1.5 | n = 1.6 | n = 1.7 |

MOTH-EYE Structure n = 1.4

Table 8 shows the results of evaluating the laminated bodies according to Test Examples 18-1 to 18-3 for luminous reflectance.

TABLE 8

|  |  | Substrate | | | | |
| --- | --- | --- | --- | --- | --- | --- |
|  |  | n = 1.3 | n = 1.4 | n = 1.5 | n = 1.6 | n = 1.7 |
| Adhesive Layer | n = 1.3 | o | o | x | x | x |
|  | n = 1.4 | o | o | o | o | x |
|  | n = 1.5 | o | o | ⊙ | ⊙ | o |
|  | n = 1.6 | x | o | o | ⊙ | o |
|  | n = 1.7 | x | x | o | o | o |

MOTH-EYE Structure n = 1.5

Table 9 shows the results of evaluating the laminated bodies according to Test Examples 19-1 to 19-3 for luminous reflectance.

TABLE 9

|  |  | Substrate | | | | |
| --- | --- | --- | --- | --- | --- | --- |
|  |  | n = 1.3 | n = 1.4 | n = 1.5 | n = 1.6 | n = 1.7 |
| Adhesive Layer | n = 1.3 | x | x | x | x | x |
|  | n = 1.4 | o | o | o | o | x |
|  | n = 1.5 | o | o | ⊙ | o | o |
|  | n = 1.6 | x | o | ⊙ | ⊙ | ⊙ |
|  | n = 1.7 | x | x | o | o | ⊙ |

MOTH-EYE Structure n = 1.6

Table 10 shows the results of evaluating the laminated bodies according to Test Examples 20-1 to 20-3 for luminous reflectance.

TABLE 10

|  |  | Substrate | | | | |
| --- | --- | --- | --- | --- | --- | --- |
|  |  | n = 1.3 | n = 1.4 | n = 1.5 | n = 1.6 | n = 1.7 |
| Adhesive Layer | n = 1.3 | x | x | x | x | x |
|  | n = 1.4 | x | x | x | x | x |
|  | n = 1.5 | o | o | o | o | o |
|  | n = 1.6 | x | o | o | ⊙ | o |
|  | n = 1.7 | x | x | o | ⊙ | ⊙ |

MOTH-EYE Structure n = 1.7

The following is determined from Tables 6 to 10.

The difference ΔR in refractive index between the MOTH-EYE structure and the substrate and the difference ΔR in refractive index between the substrate and the adhesive layer can be adjusted to 0.1 or less to reduce Fresnel reflections at the interfaces between the respective layers, and achieve excellent visibility.

<8. Expansion Coefficient>

Test Example 21

The curl amount of printed paper due to environmental change was analyzed by a finite element method. The analysis result is shown in Table 12. It is to be noted that ANSYS (from ANSYS, INC.) was used as the program.

FIG. 14A is a schematic diagram of an analysis model according to test example 21. The analysis model is symmetric with respect to the origin (the center of the printed paper), and thus, as shown in FIG. 14A, a symmetric boundary condition was set up to regard the origin as a restrained position. Assumed as the environmental change was an environmental change from 25° C. and 50% RH to 60° C. and 90% RH. However, the analysis was made without considering the gravity.

Table 11 shows the setting conditions for each layer of the printed paper as an analysis model. It is to be noted that the gelatin and cellulose have a relationship of "Temperature Change>>Thermal Change", and the humidity expansion coefficient was thus set as the expansion coefficient for the gelatin and cellulose. In addition, the polyethylene has a relationship of "Thermal Change>>Temperature Change", and the linear expansion coefficient was set as the expansion coefficient for the polyethylene.

TABLE 11

| | Structure | Material | Thickness [μm] | Young's modulus [MPa] | Linear Expansion Coefficient (1/K) | Humidity Expansion Coefficient (1/% RH) | Expansion Coefficient |
|---|---|---|---|---|---|---|---|
| Film | Film Single Layer | | 50 | 8000 | | | $1.0 \times 10^{-6}$ to $1.0 \times 10^{-4}$ |
| Printed Paper Body | Ink Layer | Gelatin | 8.8 | 10 | — | $8.0 \times 10^{-6}$ | — |
| | White Resin Layer | PE | 28 | 450 | $1.1 \times 10^{-4}$ | — | — |
| | Fiber Layer | Cellulose | 179 | 1000 | — | $7.0 \times 10^{-5}$ | — |
| | Transparent Resin Layer | PE | 20 | 450 | $1.1 \times 10^{-4}$ | — | — |

PE: Polyethylene

FIGS. 14B and 14C are pattern diagrams illustrating types of curl in the analysis model. As shown in FIG. 14A, when a state is presumed with the MOTH-EYE film side as an upper side and the printed paper side as a lower side, the printed paper curled (curved) in such a way that the MOTH-EYE film surface has a recessed central portion is referred to "concave curl". As shown in FIG. 14B, when a state is presumed with the MOTH-EYE film side as an upper side and the printed paper side as a lower side, the printed paper curled (curved) in such a way that the MOTH-EYE film surface has a projected central portion is referred to "convex curl". The curl amount in the case of the concave curl (the end position above the center position) is defined as the "positive curl amount (+Δx)", whereas the curl amount in the case of the convex curl (the end position below the center position) is defined as the "negative curl amount (−Δx)". The curl amount herein refers to, as shown in FIGS. 14B and 14C, the displacement of the end position of the printed paper with the center position of the printed paper 10 as a standard.

FIG. 15A is a pattern diagram illustrating the layer structure of printed paper as an analysis model. It is to be noted that sections corresponding to those in the embodiment described above are denoted by the same reference numerals in FIG. 15A.

A laminated body including the following structure was modeled as printed paper 6.
Shape of Printed Paper 6: Rectangle
Size of Printed Paper 6: 89 nm×127 mm
Laminated Constitution Film 2/Ink Layer 6d/White Resin Layer 6c/Fiber Layer 6b/Transparent Resin Layer 6a
(It is to be noted that the film 2 corresponds to the substrate 2 of the MOTH-EYE film, and the setting of the MOTH-EYE structure on the film surface is omitted in this analysis. In addition, the laminated body 6 composed of the ink layer 6d, the white resin layer 6c, the fiber layer 6b, and the transparent resin layer 6a corresponds to the printed material body 6.)

Table 12 shows the analysis results of Test example 21.

TABLE 12

| Film Expansion Coefficient | Curl Amount (mm) |
|---|---|
| $1.0 \times 10^{-6}$ | 21.95 |
| $5.0 \times 10^{-6}$ | 20.67 |
| $1.0 \times 10^{-5}$ | 19.06 |
| $5.0 \times 10^{-5}$ | 6.202 |
| $6.0 \times 10^{-5}$ | 2.99283 |
| $7.0 \times 10^{-5}$ | −0.289203 |
| $8.0 \times 10^{-5}$ | −3.4471 |
| $9.0 \times 10^{-5}$ | −6.6591 |
| $1.0 \times 10^{-4}$ | −9.87 |

The following is determined from Table 12.

When the expansion coefficient (humidity expansion coefficient) of the layer (fiber layer) with the highest expansion coefficient among the layers constituting the printed paper is referred to as $\alpha 1$, whereas the expansion coefficient of the film is referred to as $\alpha 2$, the printed paper can be kept substantially planar with $\alpha 2 = \alpha 1$. In addition, the printed paper can be curled into a convex shape with $\alpha 2 > \alpha 1$. Therefore, considering the appearance of the printed paper, the expansion coefficients $\alpha 1$ and $\alpha 2$ preferably satisfy the relationship of $\alpha 2 \geq \alpha 1$, and more preferably satisfy the relationship of $\alpha 2 > \alpha 1$.

Test Example 22

Except for the setting conditions for each layer of printed paper as an analysis model as shown in Table 13, the curl amount of printed water due to environmental change was analyzed in the same way as in Test Example 21. The analysis result is shown in Table 14.

Table 13 shows the setting conditions for each layer of the printed paper as an analysis model.

TABLE 13

| | Structure | Material | Thickness [μm] | Young's modulus [MPa] | Linear Expansion Coefficient (1/K) | Humidity Expansion Coefficient (1/% RH) | Expansion Coefficient |
|---|---|---|---|---|---|---|---|
| Film | Film Single Layer | | 50 | 8000 | | | $1.0 \times 10^{-6}$ to $7.0 \times 10^{-5}$ |
| Printed Paper Body | Ink Layer | Gelatin | 8.8 | 10 | — | $8.0 \times 10^{-6}$ | — |
| | White Resin Layer | PET | 28 | 8200 | $6.0 \times 10^{-5}$ | — | — |
| | Fiber Layer | Cellulose | 179 | 10000 | — | $7.0 \times 10^{-5}$ | — |
| | Transparent Resin Layer | PET | 20 | 8200 | $6.0 \times 10^{-5}$ | — | — |

PET: Polyethylene Terephthalate

Table 14 shows the analysis results of Test example 22.

TABLE 14

| Film Expansion Coefficient | Curl AmountΔx (mm) |
|---|---|
| $1.0 \times 10^{-6}$ | 16.76 |
| $5.0 \times 10^{-6}$ | 15.76 |
| $1.0 \times 10^{-5}$ | 14.52 |
| $5.0 \times 10^{-5}$ | 4.52 |
| $6.0 \times 10^{-5}$ | 2.03 |
| $7.0 \times 10^{-5}$ | -0.5 |

The following is determined from Table 14.

When the expansion coefficient (humidity expansion coefficient) of the layer (fiber layer) with the highest expansion coefficient among the layers constituting the printed paper is referred to as $\alpha1$, whereas the expansion coefficient of the film is referred to as $\alpha2$, the printed paper can be kept substantially planar with $\alpha1=\alpha2$. In addition, the printed paper can be curled into a convex shape with $\alpha2>\alpha1$. Therefore, considering the appearance of the printed paper, the expansion coefficients $\alpha1$ and $\alpha2$ preferably satisfy the relationship of $\alpha2\geq\alpha1$, and more preferably satisfy the relationship of $\alpha2>\alpha1$.

Test Example 23

Except that the following analysis model was set, the curl amount of printed water due to environmental change was analyzed in the same way as in Test Example 21. The analysis result is shown in Table 16.

FIG. 15B is a pattern diagram illustrating the layer structure of printed paper as an analysis model. It is to be noted that sections corresponding to those in the embodiment described above are denoted by the same reference numerals in FIG. 15B.

A laminated body including the following structure was modeled as printed paper 6.
Shape of Printed Paper 6: Rectangle
Size of Printed Paper: 89 nm×127 mm
Laminated Constitution Film 2/Ink Layer 6d/Film Layer 6e
(It is to be noted that the film 2 corresponds to the substrate 2 of the MOTH-EYE film, and the setting of the MOTH-EYE structure on the film surface is omitted in this analysis. In addition, the laminated body 6 composed of the ink layer 6d and the film layer 6e corresponds to the printed material body 6.)

Table 15 shows the setting conditions for each layer of the printed paper as an analysis model.

TABLE 15

| | Structure | Material | Thickness [μm] | Young's modulus [MPa] | Linear Expansion Coefficient (1/K) | Humidity Expansion Coefficient (1/% RH) | Expansion Coefficient |
|---|---|---|---|---|---|---|---|
| Film | Film Single Layer | | 50 | 8000 | | | $1.0 \times 10^{-6}$ to $6.0 \times 10^{-5}$ |
| Printed Paper Body | Ink Layer | Gelatin | 8.8 | 10 | — | $8.0 \times 10^{-6}$ | — |
| | Film Layer | PET | 230 | 8200 | $6.0 \times 10^{-5}$ | — | — |

Table 16 shows the analysis results of Test example 23.

TABLE 16

| Film Expansion Coefficient | Curl Amount (mm) |
|---|---|
| $1.0 \times 10^{-6}$ | 15.03 |
| $5.0 \times 10^{-6}$ | 13.99 |
| $1.0 \times 10^{-5}$ | 12.69 |
| $5.0 \times 10^{-5}$ | 2.26 |
| $6.0 \times 10^{-5}$ | -0.34 |

The following is determined from Table 16.

When the expansion coefficient (linear expansion coefficient) of the layer (film layer) with the highest expansion coefficient among the layers constituting the printed paper is referred to as $\alpha1$, whereas the expansion coefficient of the film is referred to as $\alpha2$, the printed paper can be kept substantially planar with $\alpha2=\alpha1$. In addition, the printed paper can be curled into a convex shape with $\alpha2>\alpha1$. Therefore, considering the appearance of the printed paper, the expansion coefficients α1 and α2 preferably satisfy the relationship of α2≥α1, and more preferably satisfy the relationship of α2>α1.

<9. Wiping Ability>

Test Example 24

Except that an ultraviolet curable resin composition was used which has the following composition, roll plasma etching was used in place of the dry etching, and materials for the ultraviolet curable resin compositions were weighed, then improved in fluidity in an oven at 60° C., mixed for 1 minute with the use of a stirrer (from THINKY CORPORATION), and returned to normal temperature for use in an experiment, an optical element was prepared in the same way as in Example 1. The aspect ratio of structures was figured out in the same way as in Example 1.

<Ultraviolet Curable Resin Composition>

| | |
|---|---|
| Urethane Acrylate | 95 parts by mass |
| (Highly Elastic Resin: Average Molecular Weight: 1000, the number of functional groups: 2) | |
| Photopolymerization Initiator | 5 parts by mass |
| Silicone Additive | 0.5 wt % |

(Polyether Modified Polydimethyl Silicone)

It is to be noted that the additive amount of the additive refers to the additive amount in the case of the ultraviolet curable resin composition regarded as 100 wt %.

Test Example 25

Except for the use of an ultraviolet curable resin composition which has the following composition, an optical element was prepared in the same way as in Test Example 24.

<Ultraviolet Curable Resin Composition>

| | |
|---|---|
| Urethane Acrylate | 80 parts by mass |
| (Highly Elastic Resin: Average Molecular Weight: 1000, the number of functional groups: 2) | |
| Hydrophilic Acrylate Monomer | 15 parts by mass |
| Photopolymerization Initiator | 5 parts by mass |
| (α-Hydroxyalkylphenone) | |
| Silicone Additive | 0.5 wt % |

Polyether Modified Polydimethyl Silicone

Test Example 26

Except for the use of an ultraviolet curable resin composition which has the following composition, an optical element was prepared in the same way as in Test Example 24.

<Ultraviolet Curable Resin Composition>

| | |
|---|---|
| Urethane Acrylate | 70 parts by mass |
| (Highly Elastic Resin: Average Molecular Weight: 1000, the number of functional groups: 2) | |
| Hydrophilic Acrylate Monomer | 25 parts by mass |
| Photopolymerization Initiator | 5 parts by mass |
| (α-Hydroxyalkylphenone) | |
| Silicone Additive | 0.5 wt % |

(Polyether Modified Polydimethyl Silicone)

Test Example 27

Except for the use of an ultraviolet curable resin composition which has the following composition, an optical element was prepared in the same way as in Test Example 24.

<Ultraviolet Curable Resin Composition>

| | |
|---|---|
| Urethane Acrylate | 60 parts by mass |
| (Highly Elastic Resin: Average Molecular Weight: 1000, the number of functional groups: 2) | |
| Hydrophilic Acrylate Monomer | 35 parts by mass |
| Photopolymerization Initiator | 5 parts by mass |
| (α-Hydroxyalkylphenone) | |
| Silicone Additive | 0.5 wt % |

(Polyether Modified Polydimethyl Silicone)

Test Example 28

Except for the use of an ultraviolet curable resin composition which has the following composition, an optical element was prepared in the same way as in Test Example 24.

<Ultraviolet Curable Resin Composition>

| | |
|---|---|
| Urethane Acrylate | 50 parts by mass |
| (Highly Elastic Resin: Average Molecular Weight: 1000, the number of functional groups: 2) | |
| Hydrophilic Acrylate Monomer | 45 parts by mass |
| Photopolymerization Initiator | 5 parts by mass |
| (α-Hydroxyalkylphenone) | |
| Silicone Additive | 0.5 wt % |

(Polyether Modified Polydimethyl Silicone)

Test Example 29

Except for the use of an ultraviolet curable resin composition which has the following composition, an optical element was prepared in the same way as in Test Example 24.

<Ultraviolet Curable Resin Composition>

| | |
|---|---|
| Urethane Acrylate | 95 parts by mass |
| (Highly Elastic Resin: Average Molecular Weight: 1500, the number of functional groups: 2) | |
| Photopolymerization Initiator | 5 parts by mass |
| Silicone Additive | 0.5 wt % |

(Polyether Modified Polydimethyl Silicone)

Test Example 30

Except for the use of an ultraviolet curable resin composition which has the following composition, an optical element was prepared in the same way as in Test Example 24.

<Ultraviolet Curable Resin Composition>

| | |
|---|---|
| Urethane Acrylate | 95 parts by mass |
| (Highly Elastic Resin: Average Molecular Weight: 1000, the number of functional groups: 2) | |
| Photopolymerization Initiator | 5 parts by mass |
| Silicone Additive | 0.5 wt % |

(Polyether Modified Polydimethyl Silicone)

Test Example 31

Except for the use of an ultraviolet curable resin composition which has the following composition, an optical element was prepared in the same way as in Test Example 24.
<Ultraviolet Curable Resin Composition>

| | |
|---|---|
| Urethane Acrylate | 95 parts by mass |
| (Highly Elastic Resin: Average Molecular Weight: 2100, the number of functional groups: 3) | |
| Photopolymerization Initiator | 5 parts by mass |
| Silicone Additive | 0.5 wt % |

(Polyether Modified Polydimethyl Silicone)

Test Example 32

Except for the use of an ultraviolet curable resin composition which has the following composition, an optical element was prepared in the same way as in Test Example 24.
<Ultraviolet Curable Resin Composition>

| | |
|---|---|
| Bifunctional Acrylate | 95 parts by mass |
| (Molecular Weight: 332, The Number of Functional Groups: 2) | |
| Photopolymerization Initiator | 5 parts by mass |
| Silicone Additive | 0.5 wt % |

(Polyether Modified Polydimethyl Silicone)

Test Example 33

Except for the use of an ultraviolet curable resin composition which has the following composition, an optical element was prepared in the same way as in Test Example 24.
<Ultraviolet Curable Resin Composition>

| | |
|---|---|
| Bifunctional Acrylate | 95 parts by mass |
| (Molecular Weight: 349, The Number of Functional Groups: 2) | |
| Photopolymerization Initiator | 5 parts by mass |
| Silicone Additive | 0.5 wt % |

(Polyether Modified Polydimethyl Silicone)

Test Example 34

Except for the use of an ultraviolet curable resin composition which has the following composition, an optical element was prepared in the same way as in Test Example 24.
<Ultraviolet Curable Resin Composition>

| | |
|---|---|
| Trifunctional Acrylate | 95 parts by mass |
| (Molecular Weight: 956, The Number of Functional Groups: 3) | |
| Photopolymerization Initiator | 5 parts by mass |
| Silicone Additive | 0.5 wt % |

(Polyether Modified Polydimethyl Silicone)

Test Example 35

Except for the use of an ultraviolet curable resin composition which has the following composition, an optical element was prepared in the same way as in Test Example 24.
<Ultraviolet Curable Resin Composition>

| | |
|---|---|
| Tetrafunctional Acrylate | 95 parts by mass |
| (Molecular Weight: 352, The Number of Functional Groups: 4) | |
| Photopolymerization Initiator | 5 parts by mass |
| Silicone Additive | 0.5 wt % |

(Polyether Modified Polydimethyl Silicone)
(Calculation of Crosslink Density)

The crosslink density was calculated in accordance with the following formula. It is to be noted that the storage elastic modulus E' was measured at normal temperature with a dynamic viscoelasticity measurement apparatus (from Rheometric Scientific F. E. Ltd.), and the absolute temperature was also a normal temperature.

$$n = E'/3RT$$

(in the formula, n represents the crosslink density (mol/L), E' represents a storage elastic modulus (Pa), R represents a gas constant (Pa·L/K·mol), and T represents an absolute temperature (K).)

(Measurement of Contact Angle and Elastic Modulus)

The methods for measuring the contact angle and the elastic modulus are the same as the methods implemented for samples 1 to 9.

(Evaluation of Wiping Ability)

The methods for dry wiping and water wiping are the same as the methods implemented for samples 1 to 9. It is to be noted that in the case of samples 10 to 21, the wiping operation was repeated until it was determined that it was possible to wipe off fingerprints. The results are shown in Table 2.

For the evaluation of the wiping ability, in Table 2, the case of the fingerprints easily wiped off several times is noted as "⊙", the case of the fingerprints wiped off on the order of 10 times is noted as "○", the case of the fingerprints wiped off on the order of several tens of times is noted as "Δ", and the case of wiping impossible is noted as "x".

TABLE 17

| | Aspect Ratio | Crosslink Density [mol/L] | Average Molecular Weight | Contact Angle [°] | Dry Wiping Property | Wet Wiping Property |
|---|---|---|---|---|---|---|
| Test Example 24 | 0.72 | 4.484 | 1000 | 34 | ⊙ | Δ |
| Test Example 25 | 0.72 | 2.124 | 1000 | 21 | ⊙ | ⊙ |
| Test Example 26 | 0.72 | 2.629 | 1000 | 10 | ⊙ | ⊙ |
| Test Example 27 | 0.72 | 1.376 | 1000 | 5.5 | ⊙ | ⊙ |
| Test Example 28 | 0.72 | 0.897 | 1000 | 4 | ⊙ | ⊙ |
| Test Example 29 | 0.72 | 1.325 | 1500 | 25 | ⊙ | ⊙ |
| Test Example 30 | 0.72 | 2.848 | 1000 | 50 | ⊙ | Δ |
| Test Example 31 | 0.72 | 5.012 | 700 | 35 | ⊙ | Δ |
| Test Example 32 | 0.72 | 12.94 | 332 | 14 | Δ | Δ |
| Test Example 33 | 0.72 | 5.017 | 349 | 32 | ○ | Δ |
| Test Example 34 | 0.72 | 4.165 | 319 | 13 | Δ | Δ |
| Test Example 35 | 0.72 | 23.93 | 176 | 60 | x | x |

Furthermore, FIG. 33 shows a graph plotting the crosslink density and inter-crosslink average molecular weight for samples 10 to 21.

The following is determined from the evaluation results described above.

In the case of samples 10 to 17 surrounded by a dotted ellipse in FIG. 33, the removal of fingerprints by dry wiping was quite easy in the evaluation of the wiping ability. This is because the structures of the optical element contains the oligomer as their main constituent, and more specifically, the inter-crosslink average molecular weight is 500 or more and 1700 or less, and the crosslink density is 0.8 mol/L or more and 5.1 mol/L or less. In particular, in the case of samples 11 to 15, the removal of fingerprints by water wiping was quite easy. This is because the contact angle of the optical element is 30 degrees or less, due to the structures with hydrophilicity.

It is to be noted that it has been also determined that the use of a bifunctional oligomer in the material for the structures makes it easy to modify the viscosity as compared with a case of using a trifunctional oligomer, and thus makes the transfer operation or the like simpler.

While the embodiments according to this technique have been specifically described, this technique is not to be considered limited to the embodiments described above, various type of modifications can be made which are based on the technical idea according to this technique.

For example, the compositions, methods, steps, shapes, materials, numerical values, etc. listed in the embodiments described above are absolutely by way of example, and different compositions, methods, steps, shapes, materials, numerical values, etc. may be used, if necessary.

In addition, it is possible to combine the compositions, methods, steps, shapes, materials, numerical values, etc. in the embodiments described above with each other, without departing from the spirit of this technique.

While the examples of applying an optical element to the surface of a printed material have been described in the embodiments described above, this technique is not to be considered limited to these examples, and may be applied to the surface of a photographic material.

REFERENCE SIGNS LIST 1 optical element
2 substrate
3 structure
3a curved portion
4 base layer
5 attachment layer
6 printed material body
7 projection
10 printed material body
11 roll master
12 structure
13 resist layer
14 laser light
15 latent image
16 transfer material
17 energy line source

The invention claimed is:

1. A printed material comprising:
a printed material body having a surface; and
an optical element provided on the surface of the printed material body,
wherein the optical element comprises multiple structures formed at a pitch of 175 nm or more and 350 nm or less, and
the multiple structures have an aspect ratio of 0.6 or more and 5.0 or less.

2. The printed material according to claim 1, wherein the optical element has a linear expansion coefficient higher than that of the printed material body.

3. The printed material according to claim 1, wherein the surface on the optical element side is curved so as to project out.

4. The printed material according to claim 1, wherein the printed material has a planar or curved peripheral edge, and the curved shape is obtained from the peripheral edges curved in a direction opposite to the optical element.

5. The printed material according to claim 1, wherein the optical element further comprises a substrate having a surface,
the multiple structures are formed on the surface of the substrate, and
the substrate satisfies relationships of: $L^* \geq 95$; $|b^*| \leq 0.53$; and $|a^*| \leq 0.05$ in transmission hue in an $L^*a^*b^*$ system.

6. The printed material according to claim 1, wherein the optical element satisfies relationships of: $L^* \geq 96$; $|b^*| \leq 1.9$; and $|a^*| \leq 0.7$ in transmission hue in an $L^*a^*b^*$ system.

7. The printed material according to claim 1, further comprising an attachment layer between the optical element and the printed material body,
wherein a difference in refractive index between the optical element and the attachment layer is 0.1 or less.

8. The printed material according to claim 7, wherein the optical element further comprises a substrate having a surface,
the multiple structures are formed on the surface of the substrate, and
a difference in refractive index between the multiple structures and the substrate and a difference in refractive index between the substrate and the attachment layer are 0.1 or less.

9. The printed material according to claim 1, wherein the optical element has surface roughness Rz of 1.7 μm or less.

10. The optical element according to claim 1, wherein the multiple structures have a crosslink density of 0.8 mol/L or more and 5.1 mol/L or less.

11. The optical element according to claim 1, wherein the multiple structures have an inter-crosslink average molecular weight in a range of 400 or more and 10000 or less.

12. The optical element according to claim 1, wherein the multiple structures have an inter-crosslink average molecular weight in a range of 700 or more and 1500 or less.

13. The optical element according to claim 1, wherein the multiple structures contain, as their constituent, at least one of an oligomer having two (meth) acryloyl groups and an oligomer having three (meth) acryloyl groups.

14. The optical element according to claim 1, wherein the multiple structures contain, as their constituent, an oligomer having two (meth) acryloyl groups.

15. The optical element according to claim 1, wherein the multiple structures contain a straight-chain polymer as their main constituent.

16. A photographic material comprising:
a photographic material body having a surface; and
an optical element provided on the surface of the photographic material body,
wherein the optical element comprises multiple structures formed at a pitch of 175 nm or more and 350 nm or less, and
the multiple structures have an aspect ratio of 0.6 or more and 5.0 or less.

17. The printed material according to claim 1, wherein when the multiple structures are arranged in a quasi-hexagonal grid pattern, a first pitch P1 of the multiple structures in a same track and a second pitch P2 of the multiple structures between two adjacent tracks satisfies relationship of $1.00 < P1/P2 < 1.1$.

18. The printed material according to claim 1, wherein when the multiple structures are arranged in a square grid pattern or a quasi-square grid pattern, a first pitch P1 of the multiple structures in a same track is longer than a second pitch P2 of the multiple structures between two adjacent tracks.

19. The printed material according to claim 18, wherein the first pitch P1 and the second pitch P2 satisfies relationship of $1.4 < P1/P2 < 1.5$.

* * * * *